US012017457B2

(12) United States Patent
Amano et al.

(10) Patent No.: US 12,017,457 B2
(45) Date of Patent: Jun. 25, 2024

(54) LIQUID EJECTING APPARATUS

(71) Applicant: SEIKO EPSON CORPORATION, Tokyo (JP)

(72) Inventors: Yusaku Amano, Matsumoto (JP); Takeshi Aoki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/448,959

(22) Filed: Sep. 27, 2021

(65) Prior Publication Data

US 2022/0097379 A1 Mar. 31, 2022

(30) Foreign Application Priority Data

Sep. 29, 2020 (JP) ................................ 2020-163402

(51) Int. Cl.
*B41J 2/165* (2006.01)
*B41J 2/14* (2006.01)

(52) U.S. Cl.
CPC ......... *B41J 2/16511* (2013.01); *B41J 2/1433* (2013.01)

(58) Field of Classification Search
None
See application file for complete search history.

(56) References Cited

U.S. PATENT DOCUMENTS 9,494,796 B2 * 11/2016 Ishibashi .............. G03B 21/145
10,500,862 B2 * 12/2019 Kinoshita ............ B41J 2/16585
2001/0038401 A1 * 11/2001 Kawase ................. B41J 25/304 347/42
2006/0232657 A1 * 10/2006 Murcia ................ B41J 25/3086 347/198
2009/0153615 A1 * 6/2009 Chikamoto .......... B41J 2/16585 347/33
2014/0285572 A1 * 9/2014 Hanaoka .............. B41J 2/16538 347/30
2014/0368576 A1 12/2014 Kishigami et al.
2018/0236797 A1 * 8/2018 Ohashi ................... B41J 2/1433
2019/0070855 A1 3/2019 Yamaguchi et al.
2019/0126621 A1 5/2019 Profaca

FOREIGN PATENT DOCUMENTS

JP 2020-026071 A 2/2020

* cited by examiner

*Primary Examiner* — Alejandro Valencia
(74) *Attorney, Agent, or Firm* — WORKMAN NYDEGGER

(57) ABSTRACT

A printer, which is an example of a liquid ejecting apparatus, including a slide mechanism that has a first member and a second member configured to slide with each other in lifting and lowering directions; a head that is fixed to the first member and has a nozzle for ejecting a liquid; a lifting and lowering mechanism that is fixed to the second member, and lifts and lowers the head in the lifting and lowering directions; and a cap that covers the nozzle. The first member is configured of a wall member having an elongated hole, and the second member is configured of a pin. The lifting and lowering mechanism relatively moves the head toward the cap in a state where the head does not slide in a direction away from the cap.

5 Claims, 15 Drawing Sheets

LIQUID EJECTING APPARATUS

The present application is based on, and claims priority from JP Application Serial Number 2020-163402, filed Sep. 29, 2020, the disclosure of which is hereby incorporated by reference herein in its entirety.

BACKGROUND

1. Technical Field

The present disclosure relates to a liquid ejecting apparatus that ejects a liquid onto a medium such as paper.

2. Related Art

For example, JP-A-2020-26071 discloses an ink jet recording apparatus which is an example of a liquid ejecting apparatus that ejects a liquid such as ink to a medium. The liquid ejecting apparatus includes a head holder that holds a recording head in which an ejecting port for ejecting the liquid is disposed, moving means capable of moving the head holder to a predetermined position, and a cap capable of capping an ejecting port surface on which the ejecting port of the recording head is disposed. Further, the liquid ejecting apparatus includes an urging member that is moved by the moving means and urges, in an abutting direction, the head holder in an abutting state against an abutting member at a predetermined position.

The moving means includes a drive gear, a slide rack gear (an example of a rack) that slides with the rotation of the drive gear, and a slide member that engages with the head holder and can slide in conjunction with the slide rack gear. The urging member is a spring member interposed between the slide rack gear and the slide member.

At a predetermined position for capping the ejecting port surface by the cap, the urging member urges the head holder in the abutting direction in a state of abutting against the abutting member which is fixed in the apparatus in a left-right contrast on both sides, in a width direction, of a support member (for example, a platen) supporting the medium. In this state, when the drive gear further rotates, a cap pressure, which is a contact pressure of the cap with respect to the ejecting port surface, is adjusted to a preferable value.

However, the liquid ejecting apparatus described in JP-A-2020-26071 has a problem that a desired cap pressure cannot be obtained unless a moving distance of the head holder by the rotation of the drive gear is increased.

SUMMARY

A liquid ejecting apparatus that solves the above problem includes a slide mechanism that has a first member and a second member configured to slide with each other in lifting and lowering directions; a head that is fixed to the first member and has a nozzle for ejecting a liquid; a lifting and lowering mechanism that is fixed to the second member, and lifts and lowers the head in the lifting and lowering directions; and a cap that covers the nozzle. The lifting and lowering mechanism relatively moves the head toward the cap in a state where the head does not slide via the slide mechanism in a direction away from the cap.

The liquid ejecting apparatus that solves the above problem includes a slide mechanism that has a first member and a second member configured to slide with each other in lifting and lowering directions; a head that is fixed to the first member and has a nozzle for ejecting a liquid; a lifting and lowering mechanism that is fixed to the second member, and lifts and lowers the head in the lifting and lowering directions; and a cap that covers the nozzle. The slide mechanism includes a first wall surface extending in the lifting and lowering directions, a second wall surface extending in a direction intersecting the lifting and lowering directions, a slide member that slides with respect to the first wall surface while being in contact with the first wall surface, and an abutting surface configured to switch presence and absence of contact with the second wall surface by sliding of the slide member.

The lifting and lowering mechanism relatively moves the head toward the cap in a state where the abutting surface is in contact with the second wall surface.

DESCRIPTION OF EXEMPLARY EMBODIMENTS

Hereinafter, a printer 1 which is an embodiment of a liquid ejecting apparatus will be described.

Figure 1:
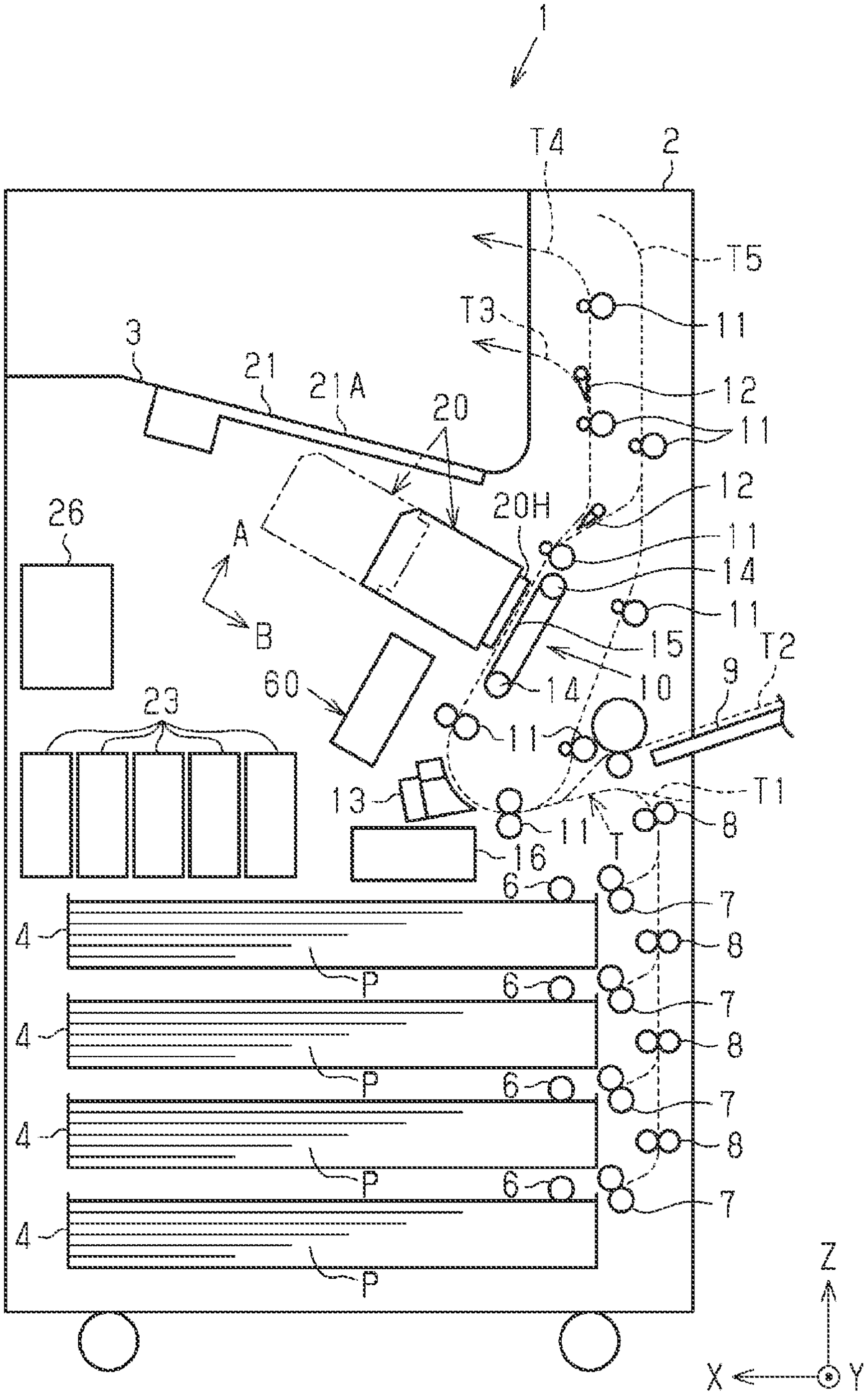
FIG. 1 is a schematic front sectional view illustrating a transport path of a medium of a printer according to an embodiment.

As illustrated in FIG. 1, the printer 1 as an example of a liquid ejecting apparatus is configured as an ink jet type apparatus that performs recording by ejecting ink, which is an example of a liquid, onto a medium P represented by recording paper. An X-Y-Z coordinate system illustrated in each drawing is an orthogonal coordinate system.

A Y direction is a width direction of the medium intersecting a transport direction of the medium, is an apparatus depth direction, and is, as an example, a horizontal direction. Further, the Y direction is an example of the apparatus depth direction intersecting both an A direction and a B direction which will be described later. A direction toward front in the Y direction is referred to as a +Y direction, and a direction toward back is referred to as a −Y direction.

An X direction is an apparatus width direction and, as an example, is the horizontal direction. A direction to left of the X direction when viewed from an operator of the printer 1 is referred to as a +X direction, and a direction to right is referred to as a −X direction. A Z direction is an apparatus height direction and, as an example, is a vertical direction. A lifting direction in the Z direction is referred to as a +Z direction, and a lowering direction is referred to as a −Z direction.

In the printer 1, the medium P is transported through a transport path T illustrated by a broken line in FIG. 1. An A-B coordinate system illustrated on an X-Z plane is an orthogonal coordinate system. The A direction is the transport direction of the medium P in a region of the transport path T, which faces a line head 20H (hereinafter, also simply referred to as the "head 20H") as an example of a head of a head unit 20. A direction toward upstream in the A direction is referred to as a −A direction, and a direction toward downstream is referred to as a +A direction. In the present embodiment, the A direction is a direction inclined such that the +A direction is located in the +Z direction rather than the −A direction. Specifically, it is inclined in a range of 50° to 70° with respect to the horizontal direction, and more specifically, inclined approximately 60°. As described above, the transport direction of the medium P in a region including a transport unit 10 in which the recording by the head unit 20 is performed is an inclined direction intersecting both the horizontal direction and the vertical direction.

The B direction is an example of a moving direction in which the head unit 20 having the head 20H moves. That is, the B direction is a moving direction in which the head unit 20 advances and retreats with respect to the transport unit 10. In the B direction, a direction in which the head 20H approaches the transport path T is referred to as a +B direction, and a direction away from the transport path T is referred to as a −B direction. In the −B direction, the head 20H is directed diagonally upward in the direction away from the transport unit 10. In the present embodiment, the B direction is a direction inclined such that the −B direction is located in the +Z direction rather than the +B direction, and is orthogonal to the A direction. The head unit 20 moves in the B direction along a path passing through a plurality of positions including a retracted position illustrated by a two-dot chain line in FIG. 1 and a recording position illustrated by a solid line in FIG. 1. The moving direction of the head unit 20 may be inclined at a predetermined angle with respect to the horizontal.

The printer 1 has a rectangular parallelepiped housing 2. A discharge section 3 is formed in the +Z direction from a center of the housing 2 in the Z direction to form a space portion in which the medium P on which information is recorded is discharged. Further, a plurality of cassettes 4 are detachably provided in the housing 2. The media P are accommodated in the plurality of cassettes 4. The medium P accommodated in each cassette 4 is transported along the transport path T by a pick roller 6 and transport roller pairs 7 and 8. A transport passage T1 in which the medium P is transported from an external device and a transport passage T2 in which the medium P is transported from a manual feed tray 9 provided in the housing 2 are joined to the transport path T.

Further, in the transport path T, the transport unit 10 which is described later, a plurality of transport roller pairs 11 for transporting the medium P, a plurality of flaps 12 for switching the path in which the medium P is transported, and a medium width sensor 13 for measuring a width of the medium P in the Y direction are disposed.

The transport path T is curved in a region facing the medium width sensor 13, and extends obliquely upward from the medium width sensor 13, that is, in the A direction. Downstream of the transport unit 10 in the transport path T, a transport passage T3 and a transport passage T4 toward the discharge section 3, and a reversing passage T5 that reverses the front and back of the medium P are provided. The discharge section 3 is provided with a discharge tray (not illustrated) in accordance with the transport passage T4.

The printer 1 has the transport unit 10 that transports the medium P, the head unit 20 that records information such as an image or a character on the medium P, and a lifting and lowering mechanism 30 that moves the head unit 20 in lifting and lowering directions. Here, the B direction is a direction in which the head unit 20 is displaced and is a direction having a component in the Z direction which is the height direction. Further, within the housing 2, a liquid accommodation section 23 for accommodating a liquid such as ink, a waste liquid storage section 16 for storing a waste liquid of ink, and a control section 26 for controlling an operation of each portion of the printer 1 are provided. The liquid accommodation section 23 supplies ink to the head 20H via a tube (not illustrated). The head 20H ejects the supplied liquid such as ink from a nozzle N (see FIG. 9).

As illustrated in FIG. 1, the printer 1 includes a maintenance device 60 that maintains the head 20H. The maintenance device 60 maintains the nozzle N of the head 20H. The maintenance device 60 includes a cap unit 62 having a cap 64 illustrated in FIG. 2.

As illustrated in FIG. 1, the discharge section 3 includes a discharge tray 21 constituting a bottom portion thereof. The discharge tray 21 is a plate-shaped member and has a placing surface 21A on which the discharged medium P is placed. Further, the discharge tray 21 is provided downstream of the transport unit 10 in the transport path T of the medium P and in the +Z direction with respect to the head unit 20 in the Z direction.

Specifically, in the discharge tray 21, a downstream end portion of the discharge tray 21 is located in the +Z direction with respect to an upstream end portion in the transport direction of the medium P. The placing surface 21A has an inclination that is obliquely upward in the discharge direction of the medium P. FIG. 1 illustrates each configuration portion of the printer 1 in a simplified manner.

The control section 26 includes a central processing unit (CPU), a read only memory (ROM), a random access memory (RAM), and a storage (not illustrated). The control section 26 controls the transport of the medium P in the printer 1 and a recording operation of information on the medium P by the head unit 20. Specifically, the control section 26 is not limited to the one that performs software processing for all the processing executed by itself. For example, the control section 26 may include a dedicated hardware circuit (for example, an application-specific integrated circuit: ASIC) that performs hardware processing for at least a part of the processing executed by itself. That is, the control section 26 can be configured as a circuitry that includes one or more processors that operate according to a computer program (software), one or more dedicated hardware circuits that execute at least a part of various processes, or a combination thereof. The processor includes a CPU and a memory such as a RAM and a ROM, and the memory stores a program code or an instruction configured to cause the CPU to execute a process. A memory, that is, computer-readable media includes any available medium accessible by a general purpose or dedicated computer.

Figure 2:
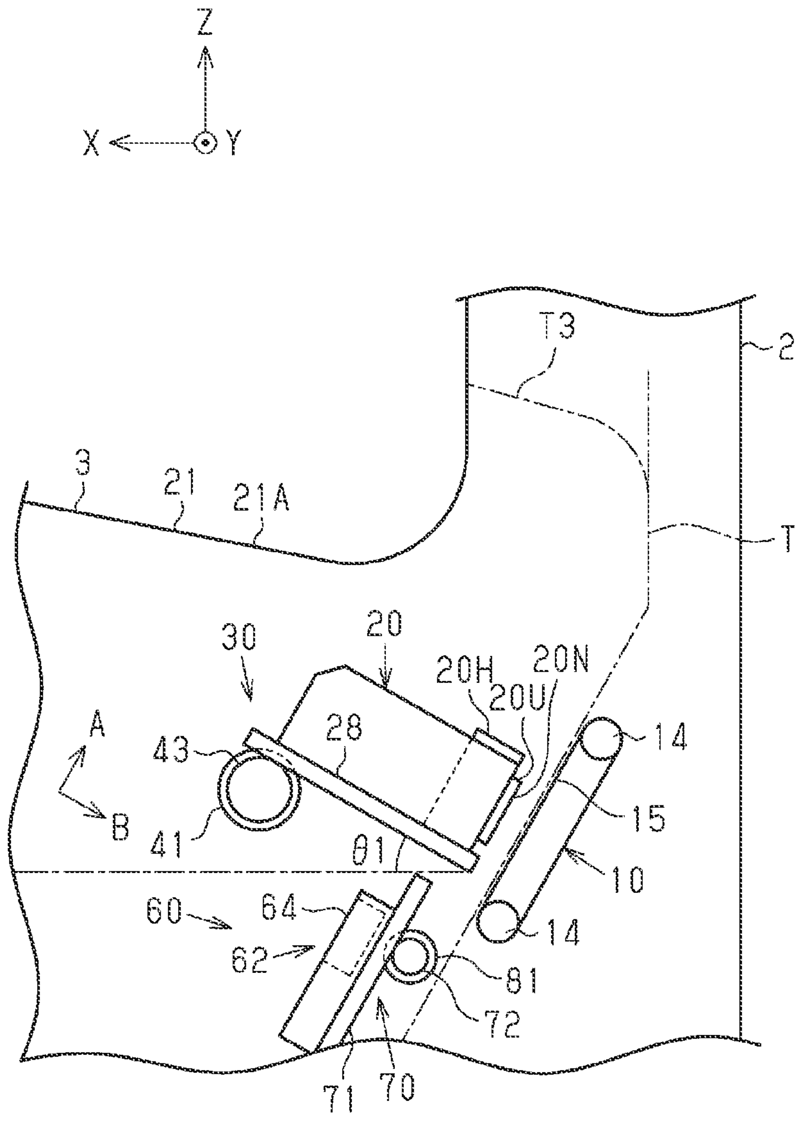
FIG. 2 is a front sectional view illustrating a periphery of a head unit.

As illustrated in FIG. 2, when viewed from the Y direction, an angle formed of the B direction and the X direction (an example of the horizontal direction) is a predetermined acute angle θ1. The B direction, in which the head unit 20 faces the transport unit 10, is the moving direction of the head unit 20. As described above, the head unit 20 of the present embodiment reciprocates in the moving direction inclined by the predetermined angle θ1 with respect to the horizontal plane. By moving the head unit 20 in the moving direction (lifting and lowering directions ±B), the head unit 20 is disposed at the recording position, the retracted position, a cap position, a head exchange position, and the like. Here, the recording position is a position of the head unit 20 when recording is performed on the medium P. The retracted position is a position where the head unit 20 is temporarily retracted from the recording position to a lifting side. The cap position is a position where the head unit 20 is lowered in the B direction from the retracted position until the head 20H abuts against the cap 64. The nozzle N of the head 20H is in a capping state of being covered by the cap 64 during standby when recording is not performed. Further, when the head unit 20 is exchanged, the head unit 20 is disposed at an exchange position. The exchange position is a position when the head unit 20 is exchanged. The exchange position is located on a side where the head unit 20 lifts (−B direction side) from the retracted position.

The lifting and lowering mechanism 30 is configured of, for example, a rack and pinion mechanism including a pinion 43 and a rack 28. The printer 1 has a motor 41 as a drive source of the pinion 43.

The head unit 20 of the present embodiment lifts diagonally upward in the −B direction inclining at the predetermined angle θ1 with respect to the horizontal plane, and lowers diagonally downward in the +B direction inclining at the predetermined angle θ1 with respect to the horizontal plane. That is, directions orthogonal to the nozzle surface 20N, which is the surface on which the nozzle N (see FIG. 9) is open in the head 20H, are the lifting and lowering directions of the head 20H. In the present specification, the directions in which the head 20H moves are also referred to as the lifting and lowering directions. In the present specification, the lifting and lowering directions including the −B direction and the +B direction are also referred to as the lifting and lowering directions ±B. The lifting and lowering mechanism 30 lifts and lowers the head unit 20 in the lifting and lowering directions ±B.

The cap unit 62 illustrated in FIG. 2 performs maintenance of the head 20H under a state where the cap 64 covers the nozzle N of the head 20H. The cap unit 62 forcibly discharges the liquid such as ink from the nozzle N of the head 20H into the cap 64. In the printer 1, the cap unit 62 stores the liquid forcibly discharged from the head 20H in the waste liquid storage section 16 illustrated in FIG. 1 as the waste liquid. The waste liquid storage section 16 stores, as the waste liquid, the liquid such as ink idle-ejected for maintenance from the head 20H toward the cap 64 (see FIGS. 8 and 12), and the liquid such as ink forcibly discharged from the nozzle N of the head 20H by cleaning.

As illustrated in FIG. 2, the printer 1 includes a moving mechanism 70 that moves the cap unit 62 in the A direction intersecting (for example, orthogonal) the B direction that is the moving direction of the head unit 20. The cap unit 62 can be reciprocated in the A direction by the moving mechanism 70. The cap unit 62 reciprocates in the A direction along a linear path passing through a plurality of positions including the standby position illustrated in FIGS. 1 and 2, and the capping position (see FIGS. 12 and 13) where the cap 64 faces the head 20H.

When the maintenance device 60 moves from the standby position to the capping position, the head unit 20 moves to the retracted position retracted in the −B direction from the recording position in order to secure a movement path of the maintenance device 60. When the head unit 20 is at the retracted position, the cap unit 62 moves to the capping position (see FIG. 12) in the +A direction. The capping position is a position where the cap 64 illustrated in FIG. 2 faces the head 20H in the B direction when being in the retracted position. After that, when moving from the retracted position in the +B direction, the head unit 20 is disposed at the cap position (see FIG. 13) where the head 20H abuts against the cap 64 at the capping position with a predetermined pressure. At the cap position where the head 20H abuts against the cap 64, the cap 64 covers the nozzle N of the head 20H.

As illustrated in FIGS. 1 and 2, the transport unit 10 is an example of a support section that supports the medium P (see FIG. 1) being transported. The transport unit 10 may have two pulleys 14, an endless transport belt 15 wound around the two pulleys 14, and a motor (not illustrated) for driving the pulleys 14. The medium P is transported at a position facing the head unit 20 while being adsorbed to a belt surface of the transport belt 15. As a method of adsorbing the medium P on the transport belt 15, a known adsorption method such as an air suction method or an electrostatic adsorption method can be adopted. As described above, the transport belt 15 supports the medium P while adsorbing the medium P. The transport unit 10 is disposed to face the head unit 20 in the B direction.

The head unit 20 has the line head 20H that ejects ink which is an example of the liquid. The line head 20H is disposed to face the transport unit 10 in the B direction at the recording position, and information is recorded on the medium P by ejecting ink from the head 20H. The head unit 20 is an ink ejecting head configured such that the head 20H for ejecting ink covers the entire region of the medium P in the Y direction as the width direction thereof. Further, the nozzle surface 20N of the head 20H is disposed in the A direction and the Y direction. The nozzle surface 20N is a surface on which the nozzle N (see FIG. 9) for ejecting the liquid in the head 20H is open.

Further, the head unit 20 is configured as an ink ejecting head capable of recording in the entire region of the medium P in the width direction thereof without moving in the width direction of the medium P. However, the type of the ink ejecting head is not limited to this, and may be the head 20H which is a type mounted on a carriage and ejects ink while moving in the width direction of the medium P.

Figure 3:
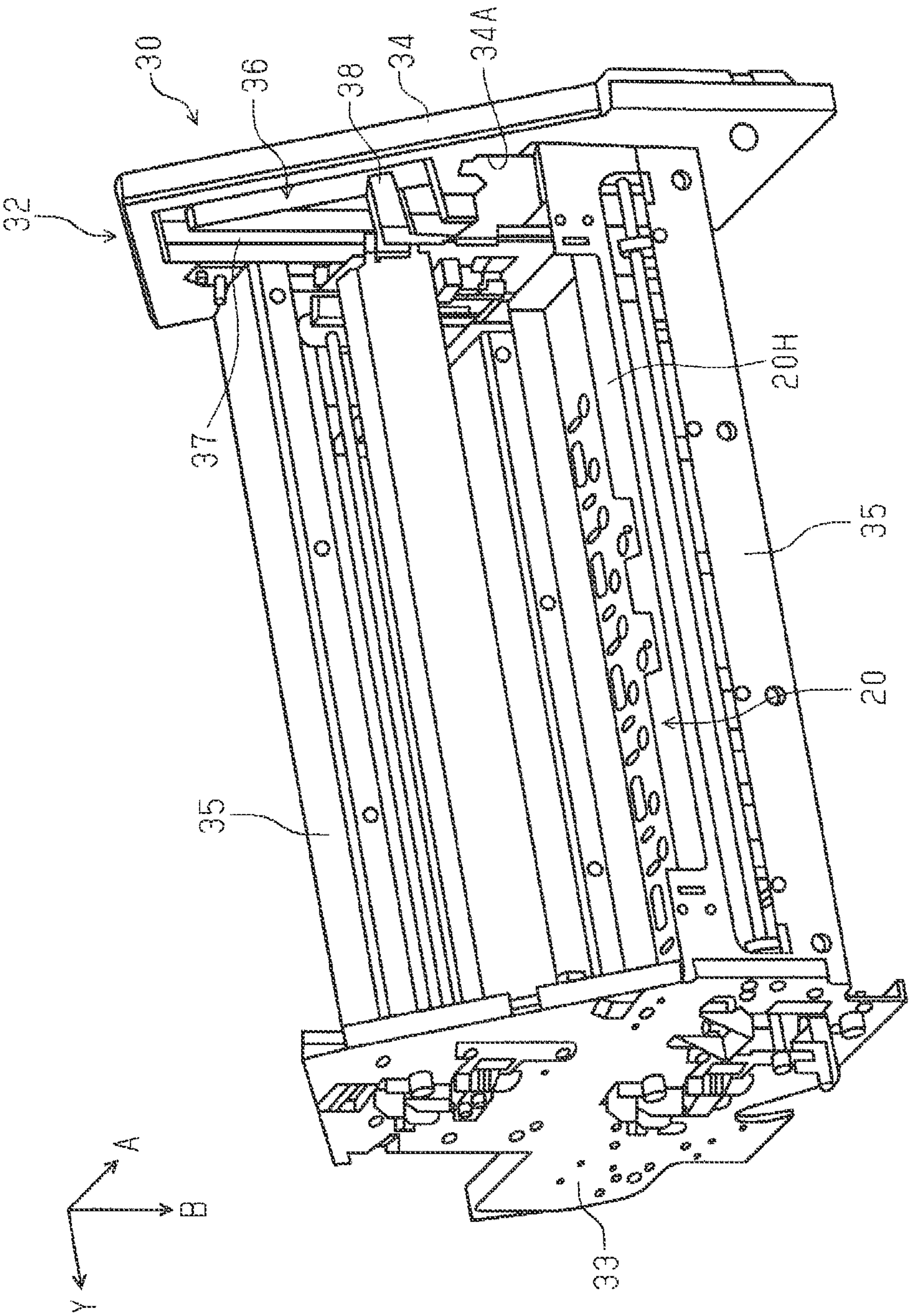
FIG. 3 is a perspective view illustrating a structure of the periphery of the head unit.

As illustrated in FIG. 3, the head unit 20 can be separated from the lifting and lowering mechanism 30 at the exchange position farthest from the transport unit 10 (see FIG. 1) in the B direction. Specifically, the head unit 20 is pulled up in the +Z direction along a guide rail 38 (see also FIG. 5) at the exchange position moved in the −B direction along a guide rail 37 (see also FIG. 5) thereby being separated from the lifting and lowering mechanism 30.

Figure 11:
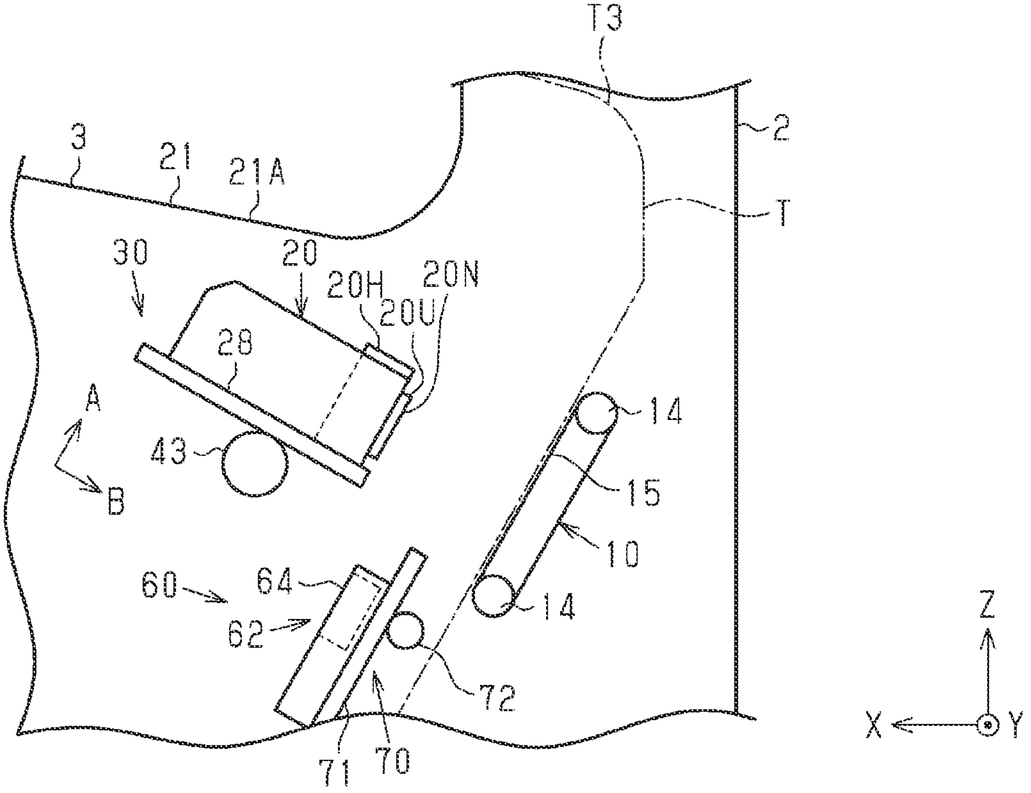
FIG. 11 is a schematic front sectional view illustrating a state when a head and a cap move relative to each other.

As illustrated in FIG. 2, the lifting and lowering mechanism 30 moves the head unit 20 in the lifting and lowering directions ±B to move the head 20H between the recording position (FIG. 2) and the retracted position (FIG. 11). In other words, the moving direction of the head unit 20 by the lifting and lowering mechanism 30 is a direction that intersects both the vertical direction and the horizontal direction.

The printer 1 illustrated in FIG. 1 has, within the housing 2, a main body frame 32 constituting a main body portion illustrated in FIG. 3, a guide member 36 for guiding the head unit 20 in the lifting and lowering directions ±B, and a drive unit 40 (see FIG. 5) that drives the head unit 20 in the lifting and lowering directions ±B. The lifting and lowering mechanism 30 moves the head unit 20 to one or more positions away from the transport unit 10 with respect to the recording position. Specifically, the lifting and lowering mechanism 30 is provided such that the head unit 20 can be moved to the recording position, the retracted position, the cap position, and the exchange position.

Figure 4:
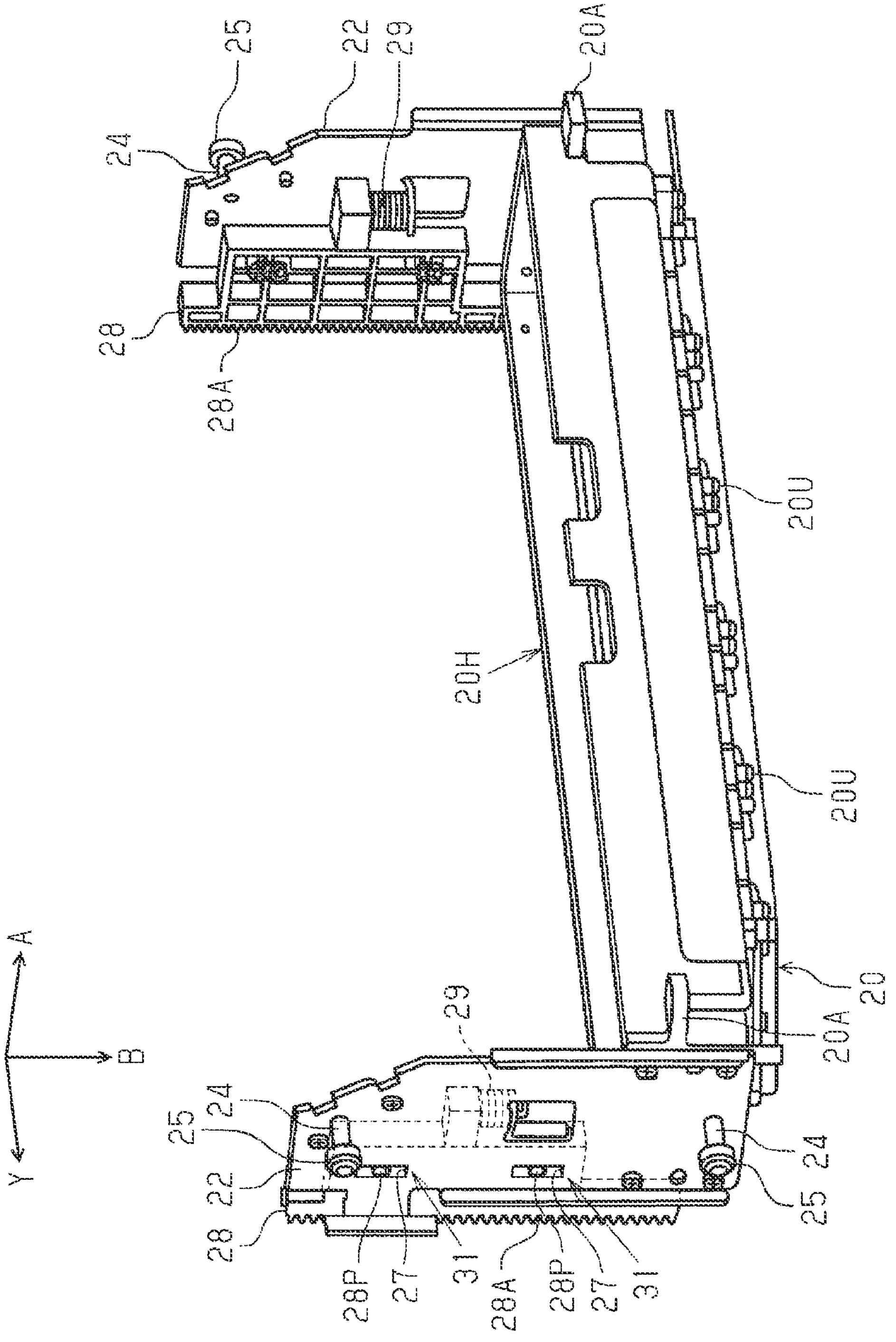
FIG. 4 is an enlarged perspective view of the head unit.

As illustrated in FIG. 4, the head 20H included in the head unit 20 extends in the Y direction. A pair of plate portions 20A protrude in the +A direction in both end portions of the head 20H in the Y direction. The head unit 20 has the head 20H and a pair of support frames 22 attached to both end portions of the head 20H in the Y direction.

The support frame 22 is configured as a side plate along an A-B plane and extends in the −B direction with respect to the head unit 20. Cylindrical support pins 24 respectively extending in the +Y direction and the −Y direction are provided at both end portions, in the B direction, of the support frame 22 on an outer surface in the Y direction. The support pin 24 is provided such that a guide roller 25 formed of an annular roller can be rotated.

Further, the rack 28 having a pin 28P is provided on the inner surface of the support frame 22 in the Y direction. The pin 28P is an example of a slide member. Further, the pin 28P protrudes outward from the rack 28 in the Y direction. The rack 28 is a plate-shaped member of which a thickness direction is the Y direction and extends in the B direction. At an end portion of the rack 28 in the −A direction, a tooth portion 28A having a plurality of teeth arranged in the B direction is formed.

Further, the head unit 20 is formed with an elongated hole 27 which penetrates in the Y direction and is long in the B direction. The pin 28P is inserted through the elongated hole 27. Therefore, the rack 28 can move relative to the support frame 22 in the B direction. That is, the rack 28 can move relative to the head unit 20 in a range in which the pin 28P can move within the elongated hole 27 in the B direction. In the present example, a slide mechanism 31 is configured of a portion including the pin 28P and the elongated hole 27 into which the pin 28P is inserted. The slide mechanism 31 allows the rack 28 to move relative to the head unit 20 in the B direction.

Figure 5:
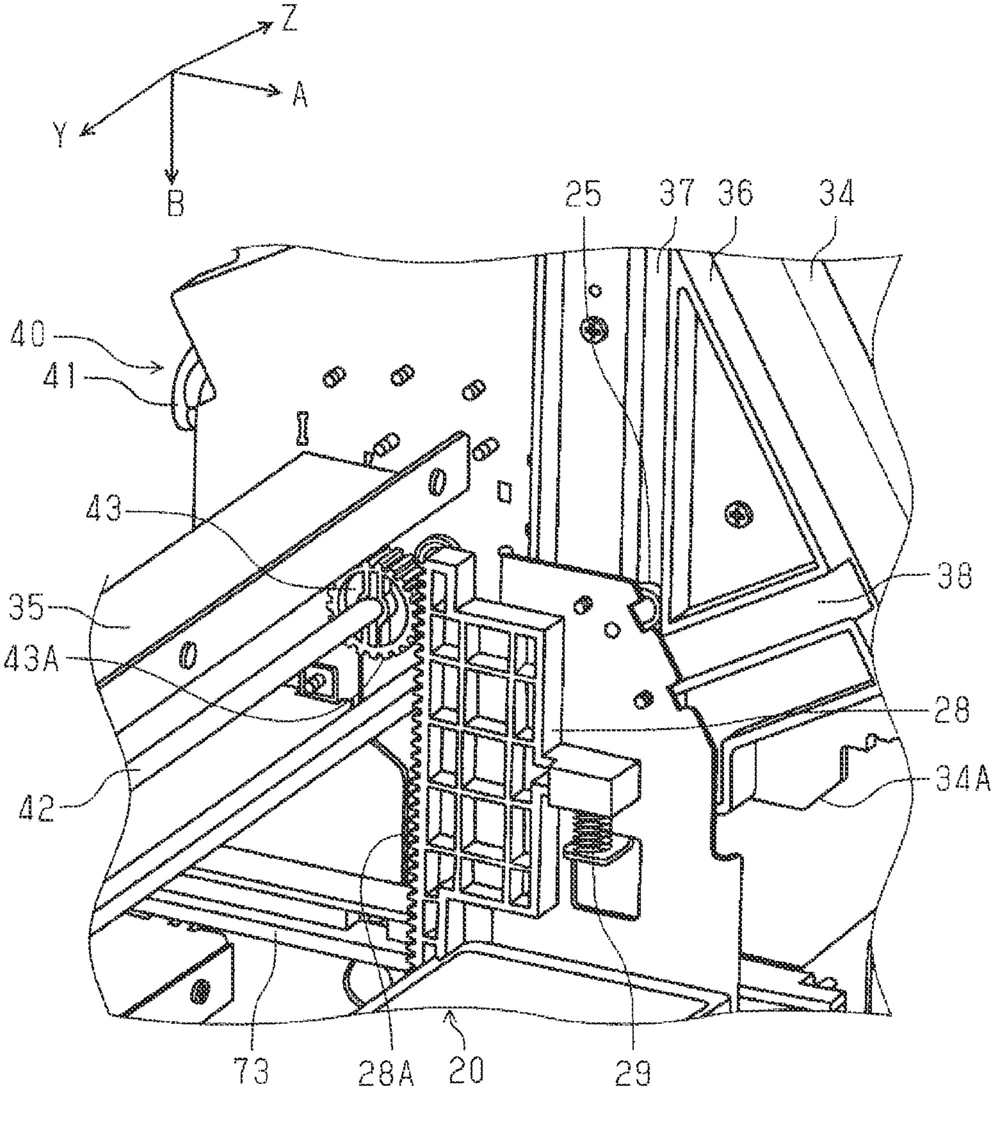
FIG. 5 is an enlarged perspective view of a part of the head unit and a main body frame.

Further, as illustrated in FIGS. 4 and 5, a second spring 29 is interposed between the rack 28 and the head unit 20. The second spring 29 is, for example, a compression spring formed of a coil spring. The second spring 29 urges so as to separate the rack 28 and the head unit 20 in the B direction. Therefore, in a case where the rack 28 is moved in the B direction under a state where the movement of the head unit 20 in the B direction, which is the lowering direction thereof, is regulated, the rack 28 moves relative to the head unit 20 in a direction approaching the head 20H with compressive deformation of the second spring 29. In FIGS. 4 and 5, the head unit 20 is in a state of being slid in the B direction with respect to the rack 28 due to a self-weight thereof and an urging force of the second spring 29. Further, the self-weight of the head unit 20 and the second spring 29 are urged so as to separate the rack 28 and the head unit 20 in the B direction. However, the pin 28P abuts against an upper end surface of the elongated hole 27, so that further slide of the head unit 20 with respect to the rack 28 is regulated in the +B direction. In a state where the head unit 20 slides most with respect to the rack 28 in the +B direction, the second spring 29 is in a state of being slightly compressed from a natural length thereof. The second spring 29 may be a tension spring or a torsion coil spring. Further, the second spring 29 is not limited to the configuration of being pulled by the weight of the head unit 20, and may be interposed between the head unit 20 and the rack 28 in a configuration of being compressed by the weight of the head unit 20.

Figure 6:
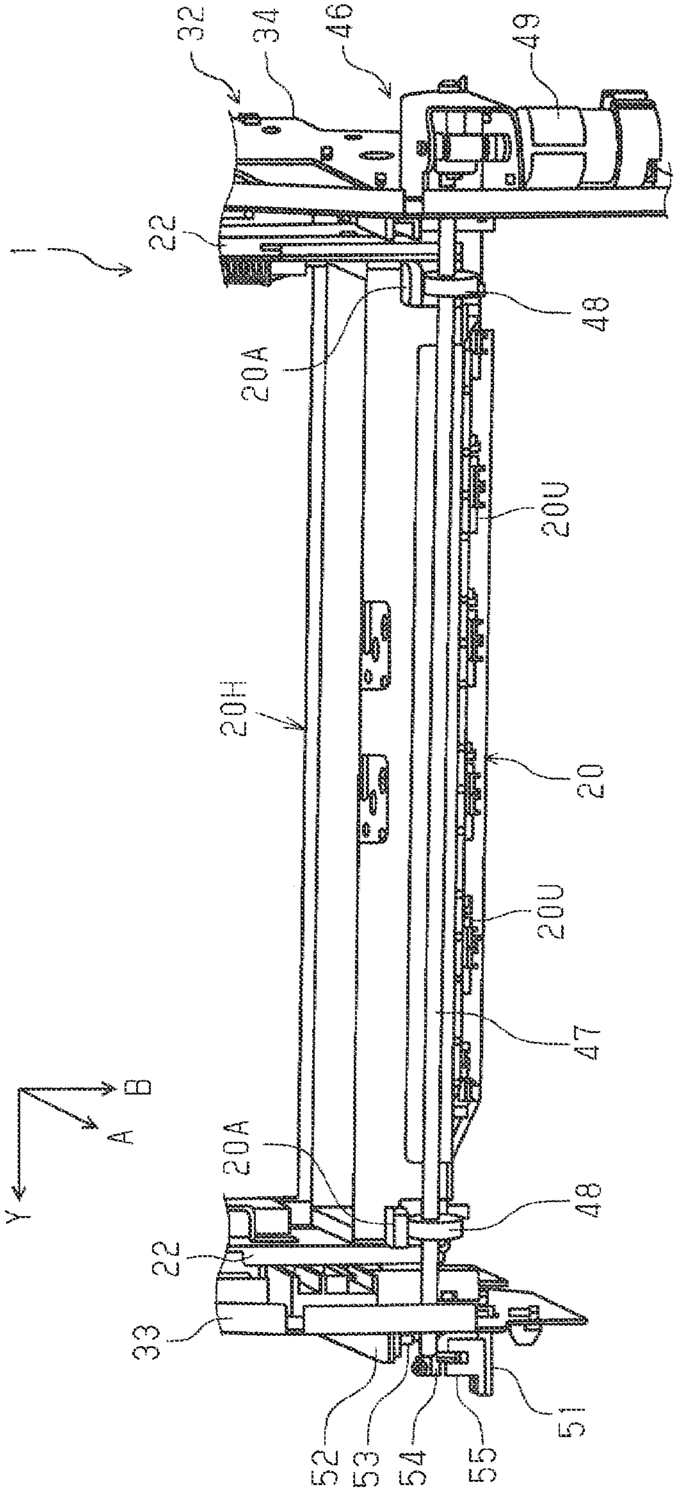
FIG. 6 is a perspective view illustrating the head unit and an adjustment unit.
Figure 7:
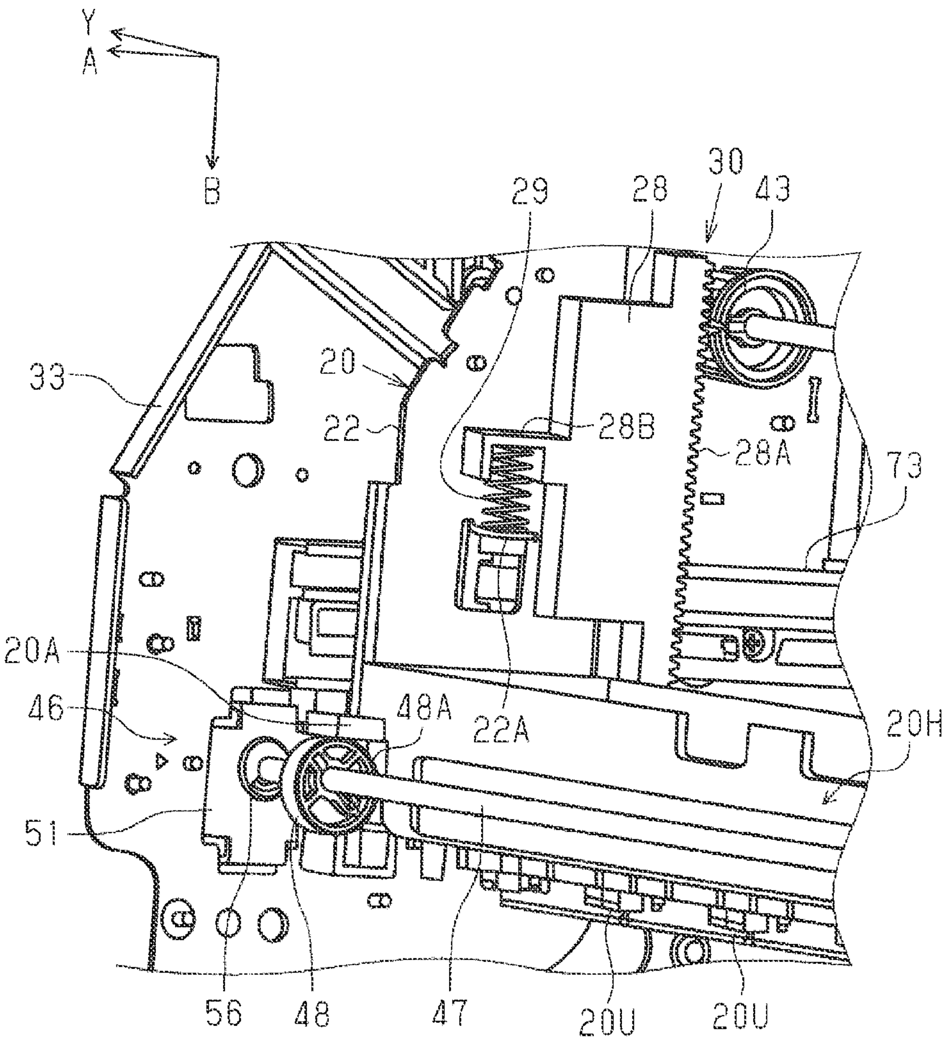
FIG. 7 is an enlarged perspective view of a part of the head unit and the adjustment unit.

As illustrated in FIGS. 4 to 7, one end portion of the second spring 29 is attached to the support frame 22 and the other end portion is attached to the rack 28. Specifically, as illustrated in FIG. 7, a first hooking portion 28B extends horizontally from the rack 28 and a second hooking portion 22A extends horizontally from an inner surface of the support frame 22. The first hooking portion 28B and the second hooking portion 22A face each other with an interval in the B direction, one end portion of the second spring 29 is hooked on the first hooking portion 28B, and the other end portion is hooked on the second hooking portion 22A. When the head unit 20 is at the retracted position, the second spring 29 is in the most extended state in a slide range due to the self-weight of the head unit 20. The most extended second spring 29 may be in a state of being slightly pulled from the natural length thereof.

Here, with reference to FIGS. 3 and 5, a configuration of the main body frame 32 to which the lifting and lowering mechanism 30 and the head unit 20 are assembled will be described. As illustrated in FIG. 3, the main body frame 32 has side frames 33 and 34, and a plurality of horizontal frames 35. The side frames 33 and 34 are respectively configured as side plates along the A-B plane, and are disposed to face each other with an interval in the Y direction. The side frame 33 is disposed in the +Y direction and the side frame 34 is disposed in the −Y direction. The side frame 34 is formed with a through-hole 34A for moving a wiper unit (not illustrated).

The plurality of horizontal frames 35 connect the side frames 33 and 34 in the Y direction. Further, the head unit 20 is disposed in a space surrounded by the plurality of horizontal frames 35.

One guide member 36 is provided on each of the side frames 33 and 34. The two guide members 36 are disposed substantially symmetrically with respect to a center of the main body frame 32 in the Y direction. Therefore, the guide member 36 in the −Y direction will be described and the description of the guide member 36 in the +Y direction will be omitted.

As illustrated in FIG. 5, the guide member 36 is attached to a side surface of the side frame 34 in the +Y direction. The guide member 36 is formed with the guide rail 37 extending in the B direction and the guide rail 38 branching from a portion in the middle of the guide rail 37 and extending in the Z direction. The guide rails 37 and 38 are both grooves that are open in the +Y direction, and guide the guide roller 25 (see FIG. 4) of the head unit 20 in the B direction or the Z direction.

As illustrated in FIG. 3, the end portion of the guide rail 37 in the −B direction may be bent in the +Z direction to form the short guide rail 38 (see FIG. 3). Further, a portion of the guide member 36 in the −Y direction, which overlaps the through-hole 34A in the Y direction, is removed. In other words, the guide member 36 is also provided in the +B direction with respect to the through-hole 34A. Therefore, the guide rail 37 in the −Y direction is divided into two with a space of a portion corresponding to the through-hole 34A therebetween.

As illustrated in FIG. 5, a set of guide rails 73 are provided on the set of side frames 33 and 34. The set of guide rails 73 are formed in a groove shape that is open inward in the Y direction, and extend in the A direction. Further, the set of guide rails 73 support a guide roller (not illustrated) configured of a plurality of rollers provided on the side surface of the maintenance device 60 so as to be movable in the A direction. That is, the maintenance device 60 (see FIG. 2) can be moved in the A direction by guiding the plurality of guide rollers by the guide rail 73 in the A direction.

As illustrated in FIG. 5, the drive unit 40 is configured to include a motor 41, a gear portion (not illustrated), a shaft 42, and a pinion 43 (drive gear). The drive unit 40 is drive-controlled by the control section 26 (see FIG. 1). The shaft 42, which is rotated by power of the motor 41, is rotatably supported by the set of side frames 33 and 34 at both end portions thereof in a state of being extended in the Y direction. The pinions 43 are attached to both end portions of the shaft 42 in the Y direction. A tooth portion 43A that meshes with the tooth portion 28A of the rack 28 is formed on an outer peripheral portion of the pinion 43.

The motor 41 rotates the shaft 42 and the pinion 43 in one direction or the opposite direction via the gear portion (not illustrated). As described above, the drive unit 40 rotationally drives the pinion 43 to allow the head unit 20 to reciprocate in the B direction.

Figure 9:
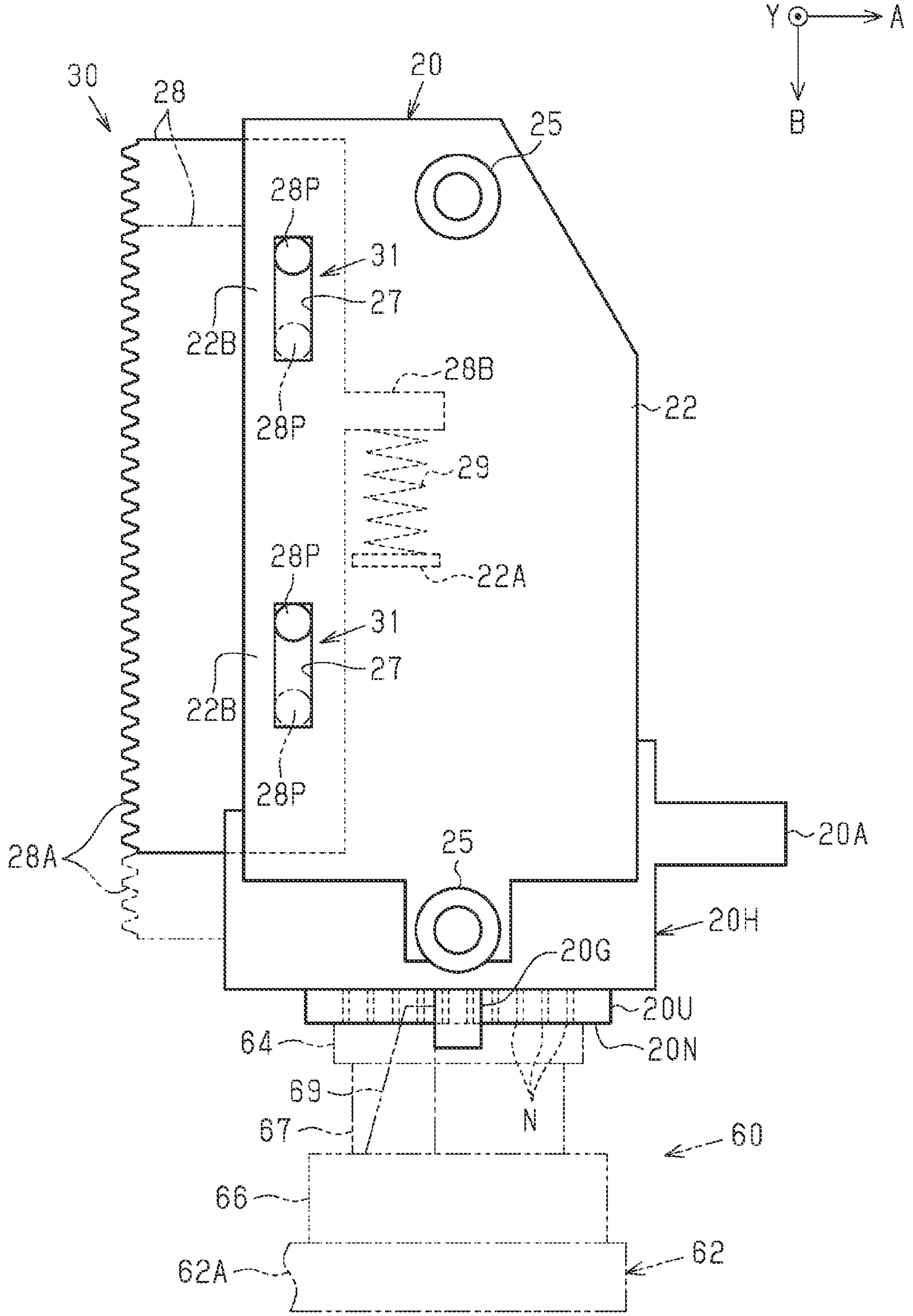
FIG. 9 is a front view illustrating the head unit and the cap unit.

Next, with reference to FIGS. 9 and 10, a detailed configuration of the head unit 20 that is lifted and lowered by the lifting and lowering mechanism 30 will be described. As illustrated in FIG. 9, the printer 1 includes the slide mechanism 31 that allows the head 20H and the rack 28 to slide with each other in the lifting and lowering directions ±B. The slide mechanism 31 has a first member and a second member that can slide with each other in the lifting and lowering directions ±B. In the present embodiment, the slide mechanism 31 has a wall member 22B having the elongated hole 27 and the pin 28P which can slide with each other in the lifting and lowering directions ±B. In the present embodiment, the wall member 22B on which the elongated hole 27 is formed corresponds to an example of the first member, and the pin 28P corresponds to an example of the second member.

Further, the lifting and lowering mechanism 30 is configured of the pinion 43, the rack 28, and the motor 41. In the present embodiment, the head 20H is fixed to the wall member 22B which is an example of the first member. The wall member 22B of the present example is configured of a part of the support frame 22. That is, the wall member 22B is formed of a portion of the support frame 22 that supports the head 20H, at which the elongated hole 27 is formed. The wall member 22B, which is an example of the first member, is integrally formed with the support frame 22.

The rack 28 constituting the lifting and lowering mechanism 30 is fixed to the pin 28P which is an example of the second member. In the present example, the pin 28P is integrally formed with the rack 28. Specifically, the rack 28 and the pin 28P are made of plastic and integrally molded.

The slide mechanism 31 is configured of inserting the pin 28P into the elongated hole 27 of the wall member 22B. The slide mechanism 31 allows the support frame 22 and the rack 28 to slide in the lifting and lowering directions ±B in a range in which the pin 28P can move within the elongated hole 27 in the B direction.

Figure 10:
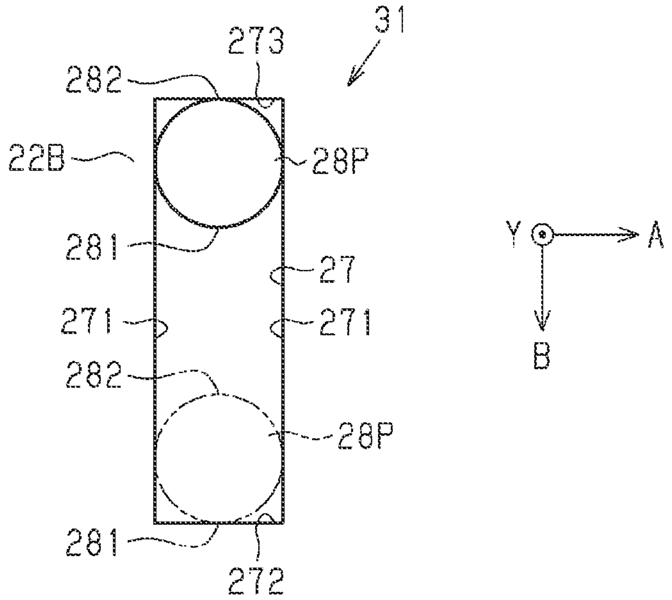
FIG. 10 is a front view illustrating a slide mechanism.

As illustrated in FIG. 10, the elongated hole 27 of the present embodiment is a rectangular hole formed in the wall member 22B and includes an inner peripheral surface thereof. Therefore, the elongated hole 27 has three wall surfaces as surfaces constituting the inner peripheral surface thereof. That is, the elongated hole 27 has a first wall surface 271 extending in the lifting and lowering directions ±B and a lower end surface 272 as an example of a second wall surface extending in a direction intersecting (for example, orthogonal) the lifting and lowering directions ±B. Further, the elongated hole 27 has an upper end surface 273 as an example of a third wall surface facing the lower end surface 272 in the lifting and lowering directions ±B. The upper end surface 273 is a surface that faces the lower end surface 272 and intersects (for example, orthogonal) the lifting and lowering directions ±B.

The slide mechanism 31 has the first wall surface 271 and the lower end surface 272 configuring the elongated hole 27, the pin 28P as an example of the slide member, and a first abutting surface 281 as an example of an abutting surface. The slide member slides with respect to the first wall surface 271 while being in contact with the first wall surface 271. The abutting surface switches the presence and absence of contact with the lower end surface 272 by sliding of the pin 28P. The first abutting surface 281 is configured of a surface portion of an outer peripheral surface of the pin 28P, which can abut against the lower end surface 272 of the elongated hole 27. That is, the first abutting surface 281 is configured of the lower surface of the pin 28P which can switch the presence and absence of contact with the lower end surface 272 of the elongated hole 27 in the outer peripheral surfaces of the pin 28P. That is, in the present example, the first abutting surface 281 formed of the lower surface of the pin 28P corresponds to an example of the abutting surface. The first abutting surface 281 may be configured of a member other than the pin 28P instead of the lower surface of the pin 28P. In that case, the second wall surface capable of switching the presence and absence of contact with the first abutting surface 281 may be formed of a member other than the elongated hole 27 instead of the lower end surface 272 of the elongated hole 27.

Further, the slide mechanism 31 includes the second spring 29 that urges the pin 28P and the lower end surface 272 to separate from each other, and the upper end surface 273 as an example of the third wall surface that extends in a direction intersecting the lifting and lowering directions ±B. The upper end surface 273 is a surface facing a side opposite to the lower end surface 272. The pin 28P has a second abutting surface 282 capable of switching the presence and absence of contact with the upper end surface 273 of the elongated hole 27 by the sliding of the pin 28P. The second abutting surface 282 is configured of an upper surface of the pin 28P. The second abutting surface 282 may be configured of a member other than the pin 28P instead of the upper surface of the pin 28P. In that case, the third wall surface capable of switching the presence and absence of the contact with the second abutting surface 282 may be configured of a member other than the elongated hole 27 instead of the upper end surface 273 of the elongated hole 27.

As illustrated in FIG. 10, the lower end surface 272, which is an example of the second wall surface, is a wall surface where the head 20H is located at an end portion in the B direction (first direction) from the retracted position to the recording position. The upper end surface 273, which is an example of the third wall surface, is a wall surface where the head 20H is located at an end portion in a direction opposite to the B direction in which the head 20H is directed from the retracted position to the recording position, that is, in the −B direction (second direction) from the recording position to the retracted position. In other words, of the two inner wall surfaces of the inner peripheral surface of the elongated hole 27 extending in the A direction intersecting the lifting and lowering directions ±B, the lower end surface 272, which is one of the +B direction side (head lowering direction side), corresponds to an example of the second wall surface. The upper end surface 273, which is a surface of the elongated hole 27 facing the lower end surface 272 in the lifting and lowering directions ±B direction, corresponds to an example of the third wall surface.

As illustrated in FIG. 9, in a capping process, the rack 28 relatively moves the head 20H toward the cap 64 in a state where the head 20H does not slide via the slide mechanism 31 in a direction away from the cap 64. That is, after the head unit 20 abuts against the cap 64, the rack 28 further lowers in the +B direction, so that the head 20H moves toward the cap 64. In the moving process of the head 20H, the head 20H abutting against the cap 64 is suppressed from moving in the +B direction, so that the second spring 29 is compressively deformed. The rack 28 slides in the +B direction with respect to the head unit 20 via the slide mechanism 31 with the compressive deformation of the second spring 29. At this time, as illustrated in FIGS. 9 and 10, the pin 28P moves along the elongated hole 27 from a position that is indicated by a solid line abutting against the upper end surface 273 of the elongated hole 27 to a position that is indicated by a two-dot chain line abutting against the lower end surface 272 of the elongated hole 27. In this process, the head unit 20 almost stops or lowers at a speed lower than a lowering speed of the rack 28. At this time, the head unit 20 slides in the −B direction with respect to the rack 28.

After the pin 28P abuts against the lower end surface 272 of the elongated hole 27, further slide of the rack 28 and the head unit 20 via the slide mechanism 31 is regulated. When the first abutting surface 281 of the pin 28P comes into contact with the lower end surface 272 of the elongated hole 27, the support frame 22 supporting the head 20H is regulated by the pin 28P so that slide in the −B direction, which is the lifting direction, is regulated. Therefore, after the pin 28P abuts against the lower end surface 272 of the elongated hole 27, the head 20H does not slide via the slide mechanism 31 in a direction away from the cap 64. Here, the "direction in which the head 20H moves away from the cap 64" is a direction opposite to the direction in which the nozzle surface 20N of the head 20H faces in the lifting and lowering directions ±B.

As illustrated in FIG. 9, a pair of positioning pins 20G protrude in the head unit 20 at positions on both sides thereof sandwiching a plurality of heads 20H therebetween in the Y direction. The pair of pins 20G protrude in the B direction to a position lower than the nozzle surface 20N of the head 20H.

Here, a configuration of the cap unit 62 will be described with reference to FIG. 8.

The printer 1 includes the cap unit 62. The cap unit 62 includes the cap 64, a cap holder 66 for holding the cap 64, and a first spring 65 provided between the cap 64 and the cap holder 66. The first spring 65 urges the cap 64 in the −B direction. In the present embodiment, the head 20H is configured by arranging a plurality of unit heads 20U illustrated in FIG. 7 in the Y direction. The cap unit 62 illustrated in FIG. 8 includes a plurality of caps 64 arranged in the Y direction at positions facing the plurality of unit heads 20U. The cap 64 is open on the −B direction side facing the head 20H and has a seal portion 64S made of a rubber elastic material provided around the opening. When the head 20H is pressed against the cap 64, at least a part of the seal portion 64S is elastically compressed. The head 20H presses the cap 64 with a predetermined cap pressure with an urging force of the first spring 65 in the −B direction (lifting direction), an urging force of the second spring 29 in the +B direction (lowering direction), and a restoring force of the elastically compressed seal portion 64S.

A size and a shape of the cap 64 are set to cover the nozzle surface 20N (see FIG. 9) of the unit head 20U constituting the head 20H. Further, the cap 64 is disposed so as to face the nozzle surface 20N in the B direction. The cap 64 covers a plurality of nozzles N which are open in the nozzle surface 20N by being in contact with the nozzle surface 20N of the head 20H with a predetermined cap pressure. By covering the nozzle surface 20N with the cap 64, drying of the head 20H is suppressed and an increase in viscosity of the liquid such as ink is suppressed. When the head unit 20 moves from the retracted position (see FIG. 12) to a predetermined cap position in the B direction that is the lowering direction, the head 20H is pressed against the cap 64 in a state where the nozzle N is covered and is in the capping state.

Figure 17:
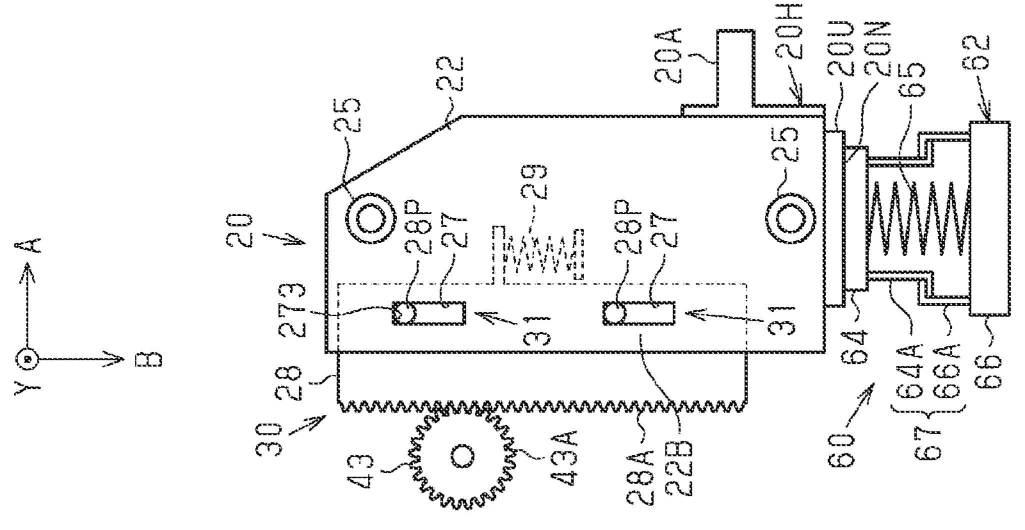
FIG. 17 is a schematic front sectional view illustrating a state when the head and the cap move relative to each other.

The cap 64 is attached to the cap holder 66 in a state of being relatively movable in the lifting and lowering directions ±B via the slide portion 67. As illustrated in FIG. 17, the slide portion 67 is configured of a first guide portion 66A extending in the −B direction that is the lifting direction from an upper surface of the cap holder 66, and a second guide portion 64A extending in the +B direction that is the lowering direction of the head 20H from a bottom surface of the cap 64, which are coupled in a state of being relatively displaceable. The first spring 65 is interposed between the bottom surface of the cap 64 and the upper surface of the cap holder 66. The first spring 65 is, for example, a compression spring. The cap 64 is urged by an elastic force of the first spring 65 in the direction-B direction that is the lifting direction with respect to the cap holder 66. The first spring 65 may be an elastic member such as a tension spring or a torsion coil spring as long as the cap 64 can be urged in the −B direction.

The cap holder 66 is supported on the housing 62A of the cap unit 62. The housing 62A is formed in a box shape that is long in the Y direction and short in the A direction (see also FIG. 9). The housing 62A is formed of a square box-shaped casing that is open on the −B direction side. A plurality of caps 64 are exposed from the opening of the housing 62A.

Figure 8:
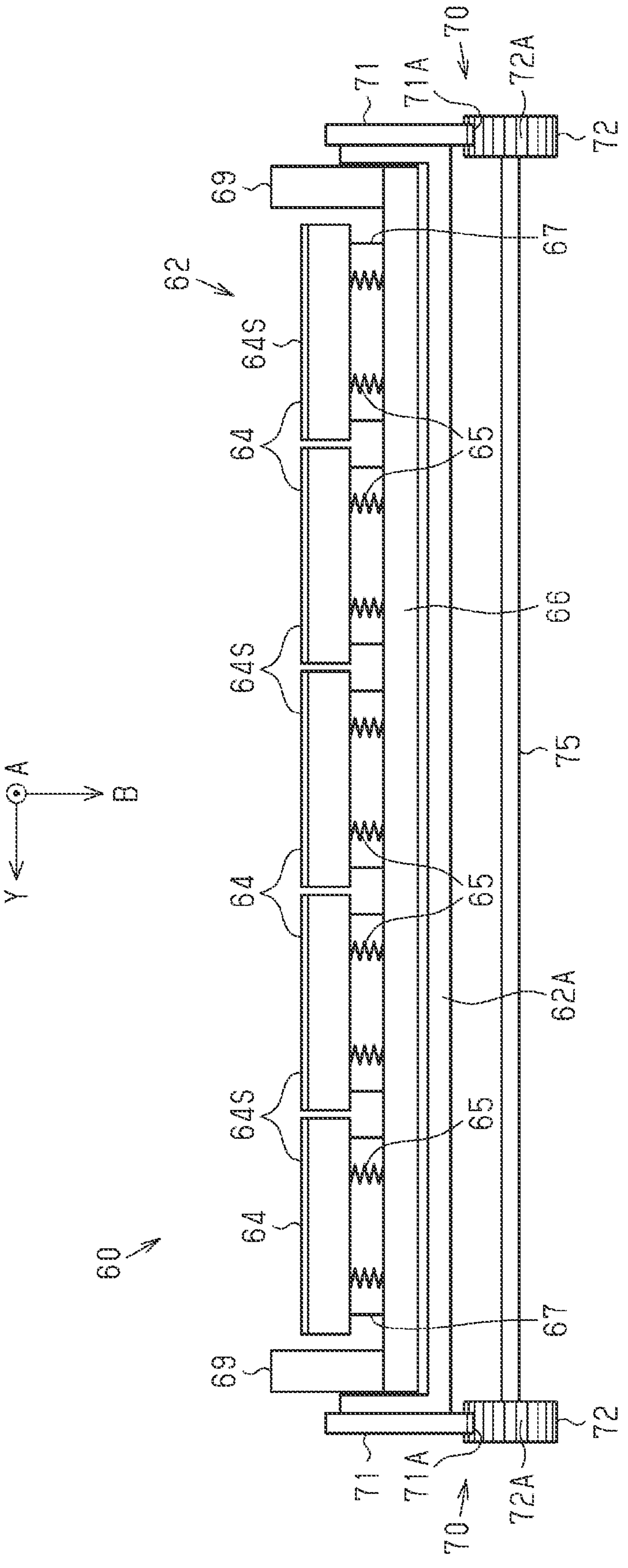
FIG. 8 is a side view illustrating a cap unit.

The printer 1 includes the moving mechanism 70 that moves the cap unit 62 illustrated in FIG. 8 in the A direction. A pair of racks 71 constituting the moving mechanism 70 are fixed to side surfaces of the housing 62A on both sides in the Y direction. A pair of pinions 72 constituting the moving mechanism 70 are disposed in a rotatable state below a pair of facing tooth portions 71A of the racks 71. The tooth portion 71A of the rack 71 and the tooth portion 72A of the pinion 72 mesh with each other. The pair of pinions 72 are connected via a rotation shaft 75. Further, on the side walls on both sides of the cap unit 62 in the +Y direction, guide rollers (not illustrated) formed of a plurality of rollers that can rotate in the Y direction that is an axial direction are provided. The guide roller is guided along the guide rail 73 (FIG. 5).

When the rotation shaft 75 is rotated by power of a motor 81 (FIG. 2) that is a drive source of the cap unit 62, the pair of pinions 72 are rotated. When the motor 81 is forward driven, the cap unit 62 moves in the A direction via the meshing between the pinion 72 and the rack 71. On the other hand, when the motor 81 is reversely driven, the cap unit 62 moves in the −A direction via the meshing between the pinion 72 and the rack 71.

Further, as illustrated in FIG. 8, a pair of engaged portions 69 for positioning protrude in the cap unit 62 at positions on both sides thereof sandwiching the plurality of caps 64 therebetween in the Y direction. The pair of engaged portions 69 protrude to a position higher than the upper surface of the cap 64 in the −B direction. In the process of moving the cap unit 62 from the standby position to the capping position, the engaged portion 69 engages with the pin 20G, so that the cap unit 62 is positioned at the capping position in the A direction.

In the capping process, the first spring 65 may be compressed by the head 20H pushing the cap 64 before the first abutting surface 281 of the pin 28P comes into contact with the lower end surface 272 of the elongated hole 27. In the present example, when the first abutting surface 281 of the pin 28P comes into contact with the lower end surface 272, the first spring 65 is already in the compressed state. After the head 20H abuts against the cap 64, the first spring 65 is also compressively deformed in the process of lowering the head 20H in the B direction with the compressive deformation of the second spring 29 by the lowering of the rack 28. As described above, the rack 28 constituting the lifting and lowering mechanism 30 moves the head 20H toward the cap 64 in a state where the first abutting surface 281 of the pin 28P abuts against the lower end surface 272 (see FIG. 17), thereby compressing the first spring 65 (see FIGS. 18 and 19).

Further, the second spring 29 of the slide mechanism 31 illustrated in FIG. 9 urges in a direction in which the first abutting surface 281 of the pin 28P is separated from the lower end surface 272 of the elongated hole 27. That is, the second spring 29 urges in a direction in which the first member formed of the wall member 22B having the elongated hole 27 is separated from the second member formed of the pin 28P.

A spring constant of the second spring 29 is smaller than a spring constant of the first spring 65. That is, the second spring constant that is the spring constant of the second spring 29 is smaller than the first spring constant that is the spring constant of the first spring 65. Therefore, in the process of further lowering the head 20H from the position where the head 20H comes into contact with the cap 64, a second lowering amount of the rack 28 that is lowered by sliding of the rack 28 with respect to the head 20H is larger than a first lowering amount of the cap 64 that is lowered by pushing into the head 20H. Therefore, in this process, the pin 28P can move from a position where the second abutting surface 282 abuts against the upper end surface 273 to a position where the first abutting surface 281 abuts against the lower end surface 272.

Further, a length of the second spring 29 in the state where the second abutting surface 282 of the pin 28P is in contact with the upper end surface 273 of the elongated hole 27 is longer than a distance between a state where the first abutting surface 281 of the pin 28P is in contact with the lower end surface 272 of the elongated hole 27 and a state where the second abutting surface 282 of the pin 28P is in contact with the upper end surface 273 of the elongated hole 27.

An elastically deformable amount (length) of the second spring 29 is longer than a distance between the lower end surface 272 and the upper end surface 273 of the elongated hole 27. The deformable amount of the second spring 29 corresponds to a maximum compression amount with which the second spring 29 can be compressively deformed at the maximum from the length of the second spring 29 to a minimum length thereof when the second abutting surface 282 of the pin 28P abuts against the upper end surface 273 of the elongated hole 27. This maximum compression amount is larger than the distance between the lower end surface 272 and the upper end surface 273 of the elongated hole 27. With this setting, the pin 28P can move within the elongated hole 27 in a range between the upper end surface 273 and the lower end surface 272. That is, in the present example, the maximum compression amount of the second spring 29 is set larger than the distance between the lower end surface 272 and the upper end surface 273, so that the pin 28P can move between the position abutting against the upper end surface 273 and the position abutting against the lower end surface 272. Therefore, from the position where the head 20H comes into contact with the cap 64, the head 20H can be further lowered from the position where the pin 28P abuts against the upper end surface 273 to the position where the pin 28P abuts against the lower end surface 272.

As illustrated in FIG. 6, the main body frame 32 is provided with an adjustment unit 46. The adjustment unit 46 includes a cam shaft 47, two eccentric cams 48, a motor 49, a holder 51, a bracket 52, an adjustment screw 53, a detected member 54, and a position sensor 55. As described above, the adjustment unit 46 includes the eccentric cams 48 and the cam shaft 47 as an example of a shaft for rotating the eccentric cam 48.

The cam shaft 47 is a member long in the Y direction and extends from the side frame 33 to the side frame 34. The two eccentric cams 48 are attached to the cam shaft 47. Outer peripheral surfaces of the two eccentric cams 48 are cam surfaces 48A (see FIG. 7). As illustrated in FIG. 6, the outer peripheral surface of the eccentric cam 48 is in contact with a portion of the plate portion 20A of the head unit 20 in the +B direction. Therefore, the two eccentric cams 48 are rotated with the rotation of the cam shaft 47, so that the position of the head 20H is adjusted in the B direction. Further, the motor 49 is driving-controlled by the control section 26 (see FIG. 1) to rotate the cam shaft 47 in one direction or the opposite direction.

The eccentric cam 48 illustrated in FIG. 7 has a cam surface 48A of which a surface facing a direction opposite to the direction in which the nozzle surface 20N of the head 20H faces is an example of the regulation surface. That is, the eccentric cam 48 has the cam surface 48A that switches the presence and absence of the contact with the head 20H by moving the head unit 20 in the lifting and lowering directions ±B. One end portion of the cam shaft 47 is inserted into a bearing 56 movably inserted into the through-hole of the holder 51 attached to the side frame 33.

As illustrated in FIG. 6, at the end portion of the adjustment unit 46 on the +Y direction side, a shaft end portion of the adjustment screw 53 supported by the bracket 52 is engaged with a screw hole of the holder 51. By rotating the adjustment screw 53 to move the holder 51 up and down, the position of the cam shaft 47 in the B direction and the position of the head unit 20 in the B direction can be adjusted. In the present example, the position of the eccentric cam 48 in the B direction can be adjusted by a manual operation of the adjustment screw 53 by an operator.

The detected member 54 attached to the end portion of the cam shaft 47 has a fan-shaped portion that protrudes from the cam shaft 47 in a radial direction. The position sensor 55 attached to the holder 51 is, for example, an optical sensor including a light emitting portion and a light receiving portion (not illustrated). The position sensor 55 detects a rotation angle of the cam shaft 47 based on the presence and absence of light blocking by the fan-shaped portion of the detected member 54. The control section 26 drives the motor 49 based on the rotation angle of the cam shaft 47 detected by the position sensor 55 to adjust the rotation angle of the eccentric cam 48. In the present embodiment, the lowering of the head unit 20 is stopped in a state where the plate portion 20A of the head 20H is in contact with the cam surface 48A of the eccentric cam 48. Therefore, the head 20H is disposed at the recording position.

The recording position of the head unit 20 illustrated in FIGS. 6 and 7 is determined according to a required gap, which is an interval between the head unit 20 and the transport unit 10 (see FIG. 1) in the B direction. The recording position is determined according to the medium type which is the type of the medium P. After the rotation of the eccentric cam 48, the drive unit 40 moves the head unit 20 in the B direction so that the plate portion 20A comes into contact with the eccentric cam 48. At this time, the compressive deformation of the second spring 29 absorbs an error of the stop position of the rack 28. After the drive unit 40 moves the head unit 20 in the B direction and the plate portion 20A comes into contact with the eccentric cam 48, the eccentric cam 48 may be rotated to position the head unit 20 at the recording position.

In the present embodiment, in a state where the head 20H and the cam surface 48A are in contact with each other, the pin 28P slides along the first wall surface 271 of the elongated hole 27. Specifically, in a state where the plate portion 20A of the head 20H is in contact with the cam surface 48A of the eccentric cam 48, the pin 28P slides in the +B direction that is a longitudinal direction of the elongated hole 27. In this sliding process, the second spring 29 is compressively deformed, and the pin 28P is separated from the upper end surface 273 of the elongated hole 27 and is located between the upper end surface 273 and the lower end surface 272. Therefore, the head unit 20 at the recording position is in a state where the plate portion 20A is pressed against the cam surface 48A of the eccentric cam 48 by the urging force of the second spring 29.

In the present example, the cam surface 48A of the eccentric cam 48 includes a first regulation surface in which the position of the head 20H in the lifting and lowering directions ±B is a first recording position and a second regulation surface in which the position of the head 20H is a second recording position. Here, in FIG. 7, a surface portion where the plate portion 20A of the head 20H is in contact with the cam surface 48A of the eccentric cam 48 corresponds to the first regulation surface, and a surface portion with which the plate portion 20A is in contact at a rotation position where the eccentric cam 48 is rotated by a predetermined angle from the state of FIG. 7 corresponds to an example of the second regulation surface.

Figure 16:
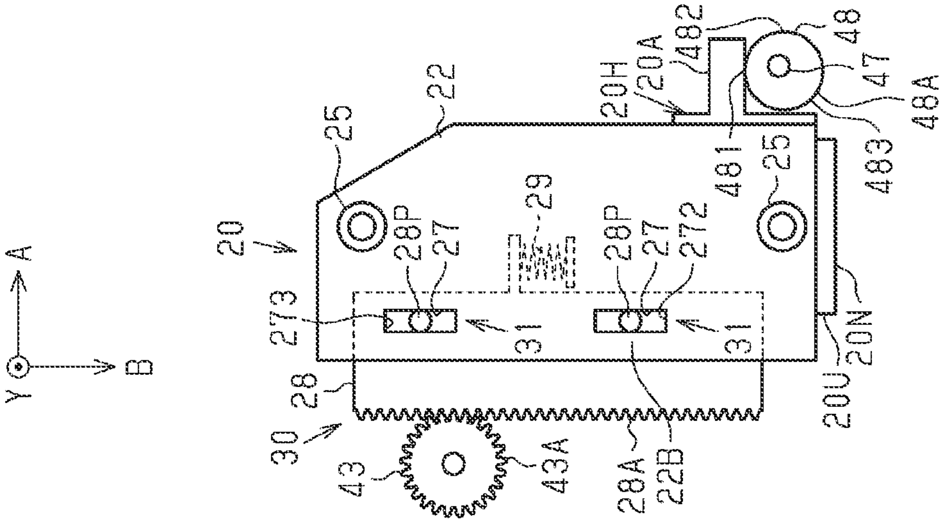
FIG. 16 is a schematic front sectional view illustrating a state when the head unit moves.

For example, as illustrated in FIG. 16, the head unit 20 is disposed at the first recording position when the plate portion 20A abuts against the first regulation surface 481 of the cam surface 48A of the eccentric cam 48. Further, in the example illustrated in FIG. 16, the cam surface 48A of the eccentric cam 48 has a second regulation surface 482 and a third regulation surface 483 in addition to the first regulation surface 481, at different positions in a circumferential direction. By rotating the eccentric cam 48, one of a plurality of regulation surfaces 481 to 483 is disposed so as to face the plate portion 20A. The head unit 20 is disposed at the second recording position when the plate portion 20A abuts against the second regulation surface 482 of the eccentric cam 48. Further, the head unit 20 is disposed at the third recording position when the plate portion 20A abuts against the third regulation surface 483 of the eccentric cam 48. The number of regulation surfaces of the eccentric cam 48 may be plural, that is, the number thereof is not limited to three, and may be two, or four or more.

As described above, the recording position of the head 20H in the lifting and lowering directions ±B can be switched in a plurality of stages. The position of the head 20H is adjusted to two or more different recording positions including the first recording position determined by the plate portion 20A being in contact with the first regulation surface 481 with respect to the cam surface 48A of the eccentric cam 48 and the second recording position determined by the plate portion 20A being in contact with the second regulation surface 482 different from the first regulation surface 481 with respect to the cam surface 48A of the eccentric cam 48. In the present embodiment, the recording position of the head 20H is configured to be switchable to a predetermined stage within the range of, for example, 3 to 6 stages.

Further, the head 20H at the recording position ejects the liquid from the head 20H under a state where the head 20H is in contact with the cam surface 48A of the eccentric cam 48. The head 20H is disposed at a recording position which is a height position according to the rotation angle of the eccentric cam 48 at that time. In the head 20H, a gap, which is an interval between the nozzle surface 20N and the transport unit 10 in the opposite direction, is adjusted according to the height position when the plate portion 20A abuts against the cam surface 48A. The head 20H ejects the liquid toward the medium P transported by the transport unit 10 under a state where an appropriate gap is secured.

As an example of the regulation surface, the cam surface 48A of the eccentric cam 48 may be exchanged with a plurality of regulation surfaces having different heights in a stepped manner. For example, the cam member having a plurality of regulation surfaces having different heights in the stepped manner may move, for example, in the A direction intersecting the B direction to switch the regulation surface facing the plate portion 20A. In this case, the control section 26 moves the cam member with power of the motor and switches the regulation surface with which the plate portion 20A is in contact, so that the gap between the head 20H and the transport unit 10 as an example of the support member supporting the medium P may be adjusted.

Figure 12:
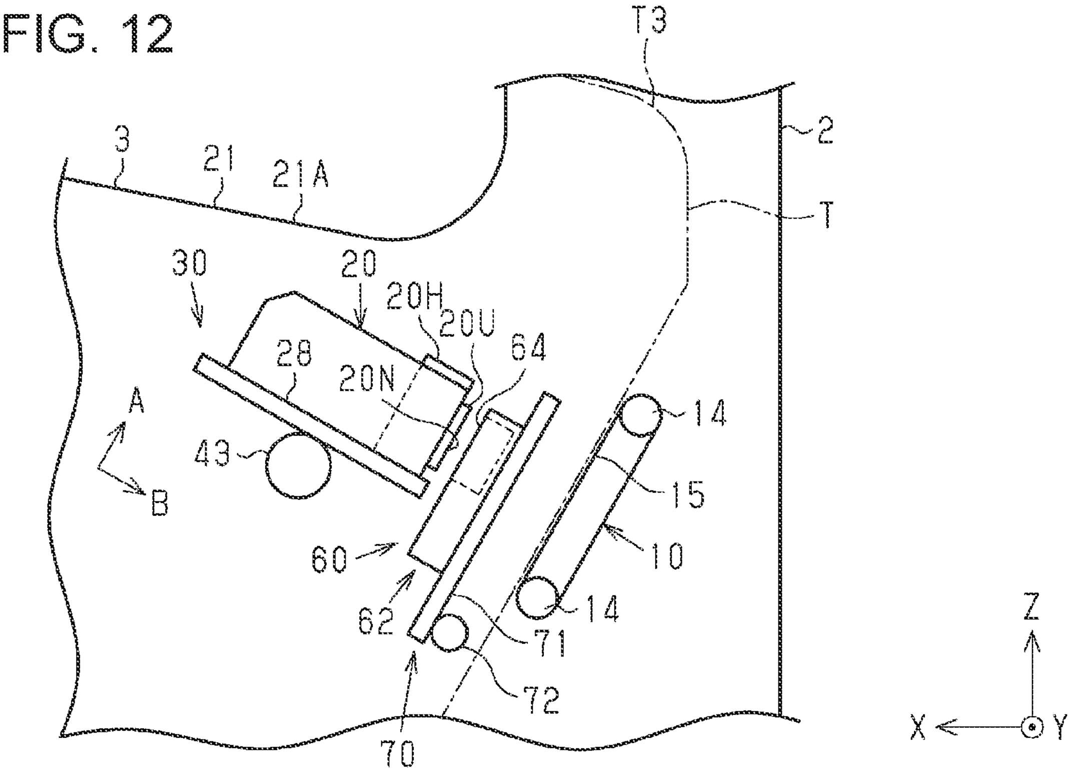
FIG. 12 is a schematic front sectional view illustrating a state when the head and the cap move relative to each other.
Figure 13:
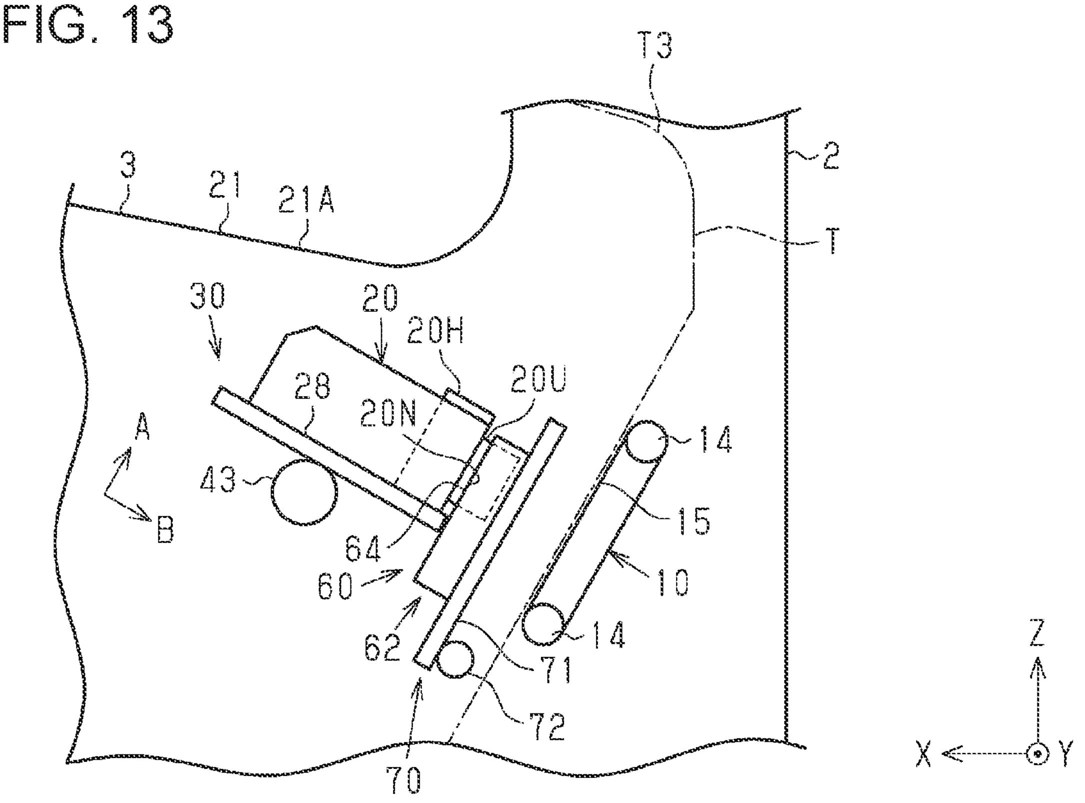
FIG. 13 is a schematic front sectional view illustrating a state when the head and the cap move relative to each other.

As illustrated in FIG. 9, the maintenance device 60 stores the head 20H and performs maintenance of the head 20H. Further, as illustrated in FIGS. 11 to 13, the maintenance device 60 is provided so as to be movable in the A direction by a drive unit (not illustrated). Specifically, the maintenance device 60 includes the cap unit 62 having the cap 64 that covers the head 20H, and a wiper unit (not illustrated) that performs cleaning by wiping the nozzle surface 20N in the head 20H.

As illustrated in FIGS. 2 and 11 to 13, the cap unit 62 is configured to include the cap 64 at a predetermined position in the A direction. The cap unit 62 moves in the A direction so that the disposition position thereof is switched between the standby position (FIG. 2) where the cap 64 does not face the head 20H and the capping position (FIGS. 12 and 13) where the cap 64 faces the head 20H. The standby position and the capping position are located in the order from upstream to downstream in the A direction. The cap unit 62 has the standby position at a position upstream of the head unit 20 in the A direction.

The capping position is a position of the cap unit 62 when the cap 64 covers the head 20H. Flushing may be performed to eject the liquid from the nozzle N of the head 20H toward the cap 64 at the capping position. In a case where the viscosity of the liquid such as ink increases in the head 20H, the viscosity of the liquid is maintained within a set range by flushing that the liquid ejects toward the cap 64. Therefore, defective ejection of the liquid such as ink from the nozzle N is suppressed.

The cap unit 62 advances or retracts in the A direction by the power of the motor 81 (FIG. 2). Specifically, the power of the motor 81 rotates the pinions 72 having the tooth portions 72A that mesh with the tooth portions 71A of the racks 71 (both of which see FIG. 8). The drive control of the motor 81 is performed by the control section 26 (see FIG. 1).

In a case where the head unit 20 (see FIG. 1) is located at the retracted position described later, the control section 26 advances the maintenance device 60 between the head unit 20 and the transport unit 10 (see FIG. 1). Further, the control section 26 retracts the maintenance device 60 from between the head unit 20 and the transport unit 10 in the −A direction before the head unit 20 is located at the recording position.

The cap unit 62 may be provided with a flushing portion that receives the liquid ejected from the nozzle N of the head 20H, in addition to the cap 64. In this case, the flushing portion may be provided so as to be movable independently of the cap unit 62. The flushing portion may be configured as a flushing box that is open in the −B direction and has porous fibers such as felt.

The maintenance device 60 includes a wiper unit (not illustrated) in addition to the cap unit 62. The wiper unit is configured to include a main body portion and a blade (both not illustrated) as an example of a cleaning portion. For example, the blade made of rectangular plate-shaped rubber wipes the nozzle surface 20N of the head 20H (see FIG. 1). The wiper unit is configured to include, for example, a motor and a belt, and moves in the Y direction by the belt that is revolved by the rotation of the motor. The wiper unit is retracted in the −Y direction with respect to the side frame 34 (see FIG. 3) in a case where the cap unit 62 covers the head 20H and in a case where the head unit 20 performs the recording.

Next, an electrical configuration of the printer 1 will be described. The printer 1 receives recording data from, for example, a host device (not illustrated). The recording data includes recording condition information and image data of, for example, a CMYK color system that defines a recording content. The recording condition information includes information such as a medium size, a medium type, presence and absence of double-sided recording, a recording color, and recording quality. The control section 26 within the printer 1 is electrically coupled to the head 20H, the transport roller pair 11, the transport belt 15, and the like. Further, the control section 26 is electrically coupled to the motor 41 that is a drive source for moving the head unit 20 in the lifting and lowering directions ±B, the motor 49 that is a drive source for rotating the eccentric cam 48, the motor 81 that is a drive source for moving the cap unit 62 in the ±A directions, and a pump motor (not illustrated) that is a drive source of a pump coupled to the cap 64.

The control section 26 controls the head 20H, the transport roller pair 11, the transport belt 15, and the like. Further, the control section 26 controls the motor 41 to move the head unit 20 in the lifting and lowering directions ±B. The control section 26 moves the head unit 20 to the retracted position (FIG. 11), the recording position (FIG. 2), and the exchange position. The exchange position is a position where the operator removes the head unit 20 from the printer 1 in a case where the head unit 20 is exchanged due to a failure or the like. The ±A directions are directions that intersects (for example, orthogonal) with the lifting and lowering directions ±B, and are directions in which the cap unit 62 having the cap 64 moves, thereby being also referred to as cap moving directions ±A.

Next, an operation of the printer 1 which is an example of the liquid ejecting apparatus will be described.

The user designates an image or the like of a recording target and sets an input of recording condition information by operating a pointing device such as a keyboard or a mouse (all not illustrated) of a host device (not illustrated). The recording condition information includes the medium size, the medium type, the recording color, the number of recorded sheets, and the like. The host device transmits a recording job including the recording condition information and the image data to the printer 1.

The printer 1 receives the recording job from the host device. The control section 26 drives the pick roller 6, the roller pairs 7, 8, and 11, and the transport unit 10 based on the recording condition information included in the recording job. As a result, the printer 1 feeds the medium P of the designated medium type and medium size from the cassette 4. The fed medium P is transported on the transport belt 15 through the transport path T. Further, the control section 26 controls the head 20H based on the image data included in the recording job. The head 20H ejects the liquid such as ink toward the medium P transported on the transport belt 15. The recorded medium P is discharged to the discharge tray 21.

The control section 26 moves the head unit 20 from the cap position to the retracted position. Next, the cap unit 62 is moved from the capping position to the retracted position. Prior to starting the recording, the control section 26 adjusts the gap between the head 20H and the transport belt 15 based on the information of the medium type. The control section 26 drives the motor 49 to rotate the eccentric cam 48 at a rotation angle according to the gap determined by the medium type.

Figure 14:
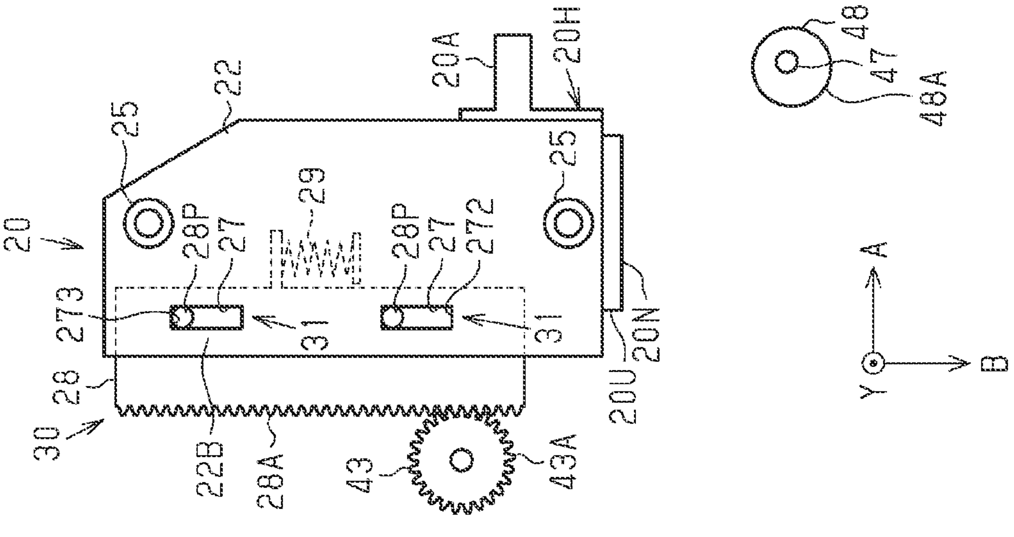
FIG. 14 is a schematic front sectional view illustrating a state when the head unit moves.

As illustrated in FIG. 14, when the head unit 20 is normally in the retracted position, the head unit 20 is at a position relatively slid in the +B direction with respect to the rack 28 by the self-weight of the head unit 20 and the urging of the second spring 29. The second abutting surface 282 (see FIG. 10) of the pin 28P is in the abutting state with the third wall surface that is the upper end surface 273 of the elongated hole 27.

Figure 15:
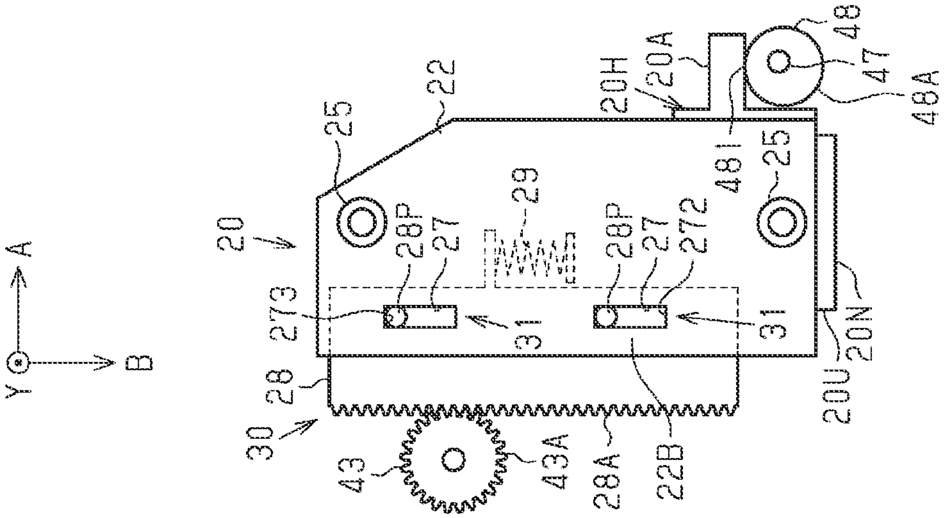
FIG. 15 is a schematic front sectional view illustrating a state when the head unit moves.

As illustrated in FIG. 15, at the time of the recording, the head unit 20 lowers from the retracted position and the plate portion 20A abuts against the eccentric cam 48, so that the head 20H is positioned at the recording position. The control section 26 forward drives the motor 41 and lowers the head unit 20 from the retracted position until the plate portion 20A abuts against the cam surface 48A of the eccentric cam 48 as illustrated in FIG. 15. The control section 26 further forward drives the motor 41 and further lowers the height position of the rack 28 from the abutting position illustrated in FIG. 15.

As illustrated in FIG. 16, the position of the head unit 20 is regulated at a position where the plate portion 20A abuts against the eccentric cam 48 and the head unit 20 does not further lower. The rack 28 lowers relative to the head unit 20 while compressively deforming the second spring 29. As a result, the pin 28P lowers from the position abutting against the third wall surface that is the upper end surface 273 within the elongated hole 27. At this time, since the second spring 29 is compressively deformed, a restoring force, with which the second spring 29 tries to be originally returned, operates in the B direction in which the head unit 20 is lowered. Therefore, in a case where the head 20H is positioned at the target recording position, a position below the target recording position including a margin is set as the target position. Therefore, even if there is some variation, positioning can be performed in a state where the plate portion 20A always abuts against the cam surface 48A (outer peripheral surface) of the eccentric cam 48. Therefore, the position accuracy when the head 20H is disposed at the recording position can be improved regardless of an individual difference of the printer 1.

At this recording position, the head 20H ejects the liquid from the nozzle N toward the medium P which is transported by the transport belt 15. At this time, since the gap between the head 20H and the transport belt 15 is adjusted at an appropriate value, the recording quality recorded on the medium P is improved.

After the recording is completed, the head 20H is capped. First, the head unit 20 retracts from the recording position (FIG. 2) to the retracted position (FIG. 11). This movement is performed by the control section 26 reversely driving the motor 41. Next, the control section 26 moves the cap unit 62 from the standby position (FIG. 11) to the capping position (FIG. 12). This movement is performed by the control section 26 forward driving the motor 81. Next, the control section 26 moves the head unit 20 from the retracted position (FIG. 12) to the cap position (FIG. 13). This movement in the capping process is performed by the control section 26 forward driving the motor 41.

Figure 18:
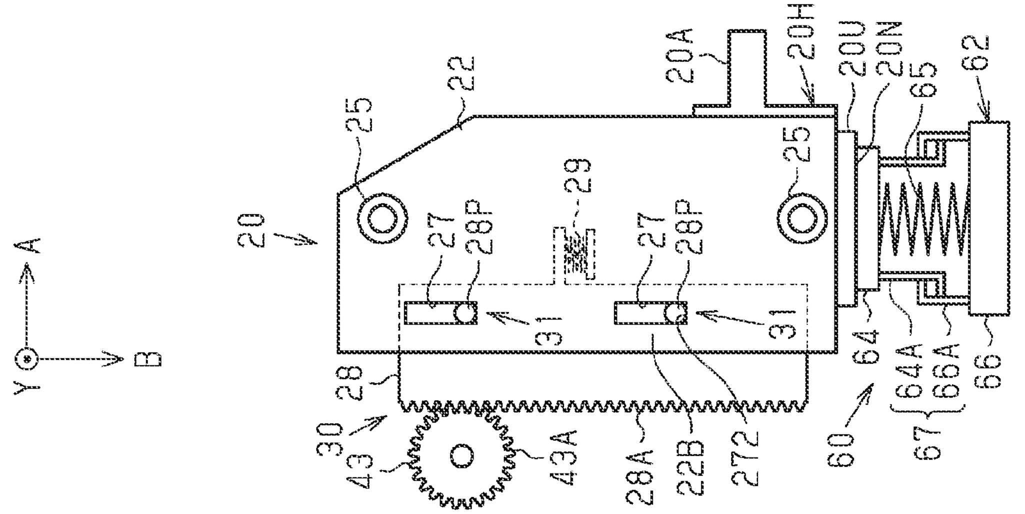
FIG. 18 is a schematic front sectional view illustrating a state when the head and the cap move relative to each other.

As illustrated in FIG. 17, in the capping process, the head 20H comes into contact with the cap 64. Further, when the head 20H is pushed in the +B direction that is the lowering side, the pin 28P is separated from the third wall surface that is the upper end surface 273 of the elongated hole 27 in accordance with the compressive deformation of the second spring 29, moves along the first wall surface 271, and abuts against the second wall surface that is the lower end surface 272 of the elongated hole 27 (FIG. 18). In the process in which the pin 28P lowers from the position where the pin 28P abuts against the upper end surface 273 of the elongated hole 27 to the position abutting against the lower end surface 272, the cap 64 lowers a little with the compressive deformation of the first spring 65 by the force in the +B direction received from the head 20H.

Here, a spring constant of the second spring 29 is smaller than a spring constant of the first spring 65. Therefore, in the moving process from the position where the pin 28P abuts against the upper end surface 273 of the elongated hole 27 to the position where the pin 28P abuts against the lower end surface 272 in the +B direction, a compression amount of the second spring 29 is greater than a compression amount of the first spring 65. Therefore, after the head 20H comes into contact with the cap 64, the lowering amount of the cap 64 is relatively small until the pin 28P moves in the +B direction along the elongated hole 27 and abuts against the lower end surface 272. In other words, after the head 20H comes into contact with the cap 64, the pin 28P can move in the +B direction along the elongated hole 27 with a relatively small lowering amount of the rack 28 to abut the lower end surface 272 of the elongated hole 27.

As illustrated in FIG. 18, after the first abutting surface 281 of the pin 28P abuts against the lower end surface 272 of the elongated hole 27, no further slide of the rack 28 and the head unit 20 is possible in the direction in which the second spring 29 is compressed. In the process from the state of FIG. 18 to the state of FIG. 19, the rack 28 and the head unit 20 are integrally lowered in the +B direction. As described above, in the process from FIG. 18 to FIG. 19, the lifting and lowering mechanism 30 moves the head 20H toward the cap 64 in a state where the head 20H does not slide toward the rack 28 in the direction away from the cap 64. As a result, after the first abutting surface 281 of the pin 28P comes into contact with the lower end surface 272 of the elongated hole 27, even if the distance for moving the head 20H in the +B direction is short, the required cap pressure can be easily obtained. In this process, the cap 64 is further lowered slightly with further compressive deformation of the first spring 65 by the pressing force in the +B direction received from the head 20H.

Figure 19:
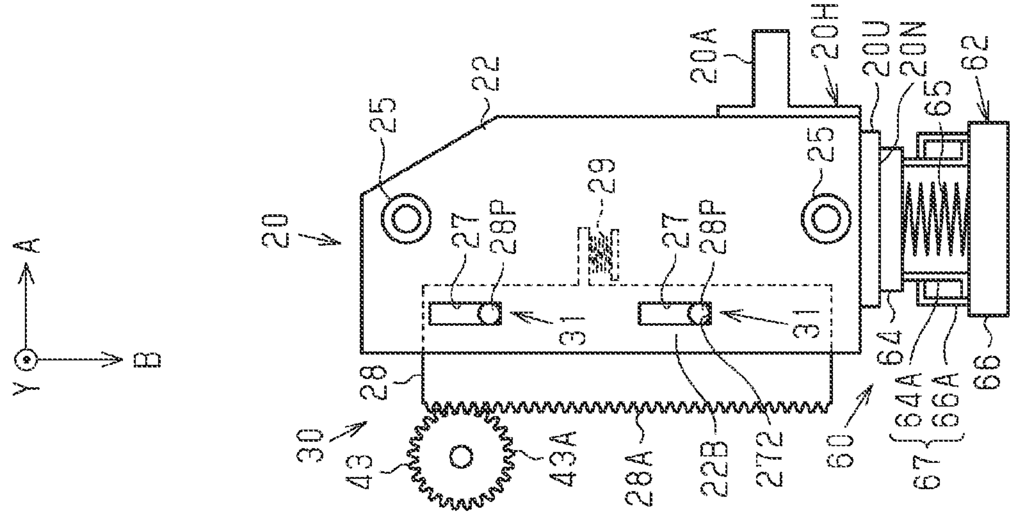
FIG. 19 is a schematic front sectional view illustrating a state when the head and the cap move relative to each other.

As illustrated in FIG. 19, when the rack 28 finishes lowering to the target position at the time of the capping, the cap 64 presses against the nozzle surface 20N of the head 20H with an appropriate cap pressure. Since an appropriate cap pressure can be obtained, drying of the liquid such as ink within the nozzle N (see FIG. 9) is effectively suppressed under this capping state.

Further, at the time of the cleaning, since a closed space surrounded by the nozzle surface 20N and the cap 64 is depressurized to a required negative pressure in the capping state, cleaning for forcibly discharging the liquid from the nozzle N is appropriately performed. The cleaning is not limited to the configuration in which the inside of the cap 64 is depressurized and, for example, the liquid within the liquid accommodation section 23 (see FIG. 1) is pressurized upstream of the nozzle N to forcibly discharge the liquid from the nozzle N.

In addition, the control section 26 manages the flushing timing during the recording. When the flushing timing is reached during the recording, the control section 26 allows the head 20H to perform the flushing. When the recording on the medium P which was recorded is completed when the flushing timing is reached, the subsequent transport of the medium P is temporarily stopped. First, the head unit 20 is moved from the recording position illustrated in FIG. 2 to the retracted position illustrated in FIG. 11. Next, the cap unit 62 is moved from the standby position to the capping position in the +A direction (for example, FIG. 12). This capping position is also the flushing position. Further, a position where the head unit 20 is slightly lowered from the retracted position may be the flushing position. The liquid is ejected from the nozzle N of the head 20H toward the cap 64. As a result, the thickening ink, air bubbles, and the like within the nozzle N are discharged together with the liquid such as the ink, and the clogging of the nozzle N is eliminated or prevented. Therefore, in the recording after the flushing, the head 20H performs the recording on the medium P with high recording quality.

When the recording is completed, the head 20H is in the capping state (FIGS. 9 and 13) where the nozzle N is covered with the cap 64. During the capping, the head unit 20 and the rack 28 are in a slidable state in the B direction. Even if the head unit 20 receives an external force caused by, for example, a paper jam or the like during the capping in which the lifting and lowering mechanism 30 is stopped, the head 20H slides in the B direction with respect to the rack 28 via the slide mechanism 31 with the deformation of the second spring 29, and thereby the impact caused by an external force when a paper jam occurs or the like can be absorbed.

As described in detail above, according to the present embodiment, the following effects can be obtained.

1. The printer 1 as an example of the liquid ejecting apparatus includes the slide mechanism 31 having the first member and the second member that can slide with each other in the lifting and lowering directions ±B. In the present embodiment, the first member is configured of the wall member 22B having the elongated hole 27, and the second member is configured of the pin 28P. Further, the printer 1 includes the head 20H that is fixed to the wall member 22B (an example of the first member) having the elongated hole 27 and has the nozzle N for ejecting the liquid, the lifting and lowering mechanism 30 that is fixed to the pin 28P (an example of the second member) and lifts and lowers the head 20H in the lifting and lowering directions ±B, and the cap 64 that covers the nozzle N. The lifting and lowering mechanism 30 relatively moves the head 20H toward the cap 64 in a state where the head 20H does not slide via the slide mechanism 31 in the direction away from the cap 64. Therefore, even if the distance for moving the head 20H from the position where the head 20H is in contact with the cap 64 is short, the required cap pressure can be easily obtained. For example, in the known configuration in which the head is stopped at a position where the head can slide via the slide mechanism in the direction away from the cap, thereby completing the capping, variation in the cap pressure is likely to occur. On the other hand, according to the present embodiment, when the cap 64 comes into contact with the head 20H while covering the nozzle N, even if the lowering amount of the rack 28 varies among the printers 1, a desired cap pressure in each printer 1 is easily obtained. Further, when the lifting and lowering mechanism 30 is stopped under the capping state where the cap 64 covers the nozzle N, for example, even if the head 20H receives an external force by the impact when a jam occurs in the medium P, the impact of the head 20H can be absorbed by the relative movement (vibration) between the head 20H and the rack 28 via the slide mechanism 31. For example, when the head 20H receives an impact, the destruction of the liquid meniscus within the nozzle N can be suppressed. In this case, poor liquid ejection due to the destruction of the meniscus can be suppressed.

2. The slide mechanism 31 has the first wall surface 271 extending in the lifting and lowering directions ±B, the lower end surface 272 extending in the direction intersecting the lifting and lowering directions ±B, the pin 28P that slides with respect to the first wall surface 271 while being in contact with the first wall surface 271, and the first abutting surface 281 that can switch the presence and absence of contact with the lower end surface 272 by the sliding of the pin 28P. The first abutting surface 281 comes into contact with the lower end surface 272, so that the head 20H does not slide in the direction away from the cap 64. Therefore, the presence and absence of the slide can be switched depending on the presence and absence of contact between the first abutting surface 281 and the lower end surface 272, so that the mechanism can be simplified. For example, as compared with a configuration using a lock mechanism that switches between locking and unlocking by power of a drive source such as a motor, a drive source such as a motor is not required, so that the configuration of the mechanism can be simplified.

3. The printer 1 has the wall member 22B having the elongated holes 27 slidable with each other in the lifting and lowering directions ±B and the slide mechanism 31 having pins 28P. Further, the printer 1 includes the head 20H that is fixed to the wall member 22B having the elongated hole 27 and has the nozzle N for ejecting the liquid, and lifting and lowering mechanism 30 that is fixed to the pin 28P, and lifts and lowers the head 20H in the lifting and lowering directions ±B. Further, the printer 1 includes the cap 64 that covers the nozzle N. The slide mechanism 31 has the first wall surface 271 extending in the lifting and lowering directions ±B, the lower end surface 272 extending in the direction intersecting the lifting and lowering directions ±B, the pin 28P that slides with respect to the first wall surface 271 while being in contact with the first wall surface 271, and the first abutting surface 281 that can switch the presence and absence of contact with the lower end surface 272 by sliding of the pin 28P. The lifting and lowering mechanism 30 relatively moves the head 20H toward the cap 64 in a state where the first abutting surface 281 is in contact with the lower end surface 272. Therefore, after the head 20H comes into contact with the cap 64, in the process until the pin 28P comes into contact with the lower end surface 272, the lifting and lowering mechanism 30 slides with respect to the rack 28 via the slide mechanism 31 in the direction in which the head 20H moves away from the cap 64. After the pin 28P comes into contact with the lower end surface 272, the head 20H does not slide with respect to the rack 28 via the slide mechanism 31 in the direction away from the cap 64. Therefore, both the above effects 1. and 2. can be obtained. That is, after the pin 28P comes into contact with the lower end surface 272, the lifting and lowering mechanism 30 relatively moves the head 20H toward the cap 64 in a state where the head 20H does not slide via the slide mechanism 31 in the direction away from the cap 64. Therefore, even if the distance for moving the head 20H after the head 20H comes into contact with the cap 64 is short, a required cap pressure can be easily obtained. Moreover, even if the head 20H receives an external force by the impact when the jam of the medium P occurs under the capping state, the vibration caused by the external force can be suppressed by the relative movement between the head 20H and the rack 28.

4. The printer 1 further includes the cap holder 66 for holding the cap 64 and the first spring 65 fixed between the cap 64 and the cap holder 66. The lifting and lowering mechanism 30 moves the head 20H toward the cap 64 to compress the first spring 65 in a state where the first abutting surface 281 of the pin 28P comes into contact with the lower end surface 272 of the elongated hole 27. Therefore, since the cap 64 can be moved by the first spring 65 following the nozzle surface 20N, the cap 64 can easily cover the nozzle N regardless of a flatness of the cap holder 66. Further, since the first spring 65 is further compressed after the first abutting surface 281 of the pin 28P comes into contact with the lower end surface 272 of the elongated hole 27, the required cap pressure is easily obtained even if the moving distance of the head 20H is short.

5. The slide mechanism 31 includes the second spring 29 that urges in the direction in which the first abutting surface 281 of the pin 20P is separated from the lower end surface 272 of the elongated hole 27, and the upper end surface 273 (an example of the third wall surface) that is a surface extending in a direction intersecting the lifting and lowering directions ±B and a surface facing the side opposite to the lower end surface 272 (an example of the second wall surface). Further, the slide mechanism 31 includes the second abutting surface 282 that can switch the presence and absence of contact with the upper end surface 273 by the sliding of the pin 28P. A spring constant of the second spring 29 is smaller than a spring constant of the first spring 65. Therefore, when the head 20H is at the lifted position not covered by the cap 64, the second abutting surface 282 of the pin 28P abuts against the upper end surface 273 of the elongated hole 27 by the urging force of the second spring 29, and thereby a posture of the head 20H is easily stabilized. Therefore, vibration when the head 20H is lifted from the cap position or the recording position can be suppressed. Therefore, destruction of the meniscus of the nozzle N due to the vibration of the head 20H can be suppressed. Further, after the head 20H comes into contact with the cap 64, the rack 28 slides with respect to the head 20H while elastically deforming the second spring 29.

Further, since the spring constant of the second spring 29 is smaller than the spring constant of the first spring 65, after the head 20H comes into contact with the cap 64, the drive amount of the rack 28 required for the pin 28P (an example of the slide member) to abut against the lower end surface 272 is relatively small. Therefore, after the head 20H comes into contact with the cap 64, the capping operation of covering the head 20H with the cap 64 can be completed immediately. Further, until the head 20H separates from the cap 64 from the capping state, the drive amount of the rack 28 required from the position where the pin 28P abuts against the lower end surface 272 (an example of the second wall surface) to the position abutting against the upper end surface 273 (an example of the third wall surface) is relatively small. Therefore, the capping operation of covering the head 20H with the cap 64 can be completed immediately.

6. The head 20H has the nozzle surface 20N which is a surface through which the nozzle N is open. The regulation surface facing a direction opposite to the direction in which the nozzle surface 20N of the head 20H faces, which is the regulation surface for switching the presence and absence of the contact with the head 20H by the movement of the head 20H in the lifting and lowering directions ±B, is provided. The first wall surface 271 of the slide mechanism 31 and the pin 28P slide in a state where the head 20H is in contact with the regulation surface. Therefore, the head 20H is in contact with the regulation surface so that positioning of the head 20H can be performed. Further, since the pin 28P of the slide mechanism 31 slides in a state where the head 20H is in contact with the regulation surface, the control of the lifting and lowering mechanism 30 can be simplified.

7. The printer 1 includes the eccentric cam 48 having the cam surface 48A and the cam shaft 47 for rotating the eccentric cam 48. The regulation surface is configured of the cam surface 48A of the eccentric cam 48, and includes the first regulation surface 481 in which the position of the head 20H in the lifting and lowering directions ±B is the first position and the second regulation surface 482 in which the position of the head 20H is the second position. Therefore, by the rotation of the eccentric cam 48, the position of the head 20H being in contact with the cam surface 48A (regulation surface) of the eccentric cam 48 in the lifting and lowering directions ±B can be changed.

8. The head 20H ejects the liquid in a state where the plate portion 20A of the head 20H is in contact with the cam surface 48A (regulation surface) of the eccentric cam 48. Therefore, the head 20H at the time of the printing can be disposed at the recording position with high position accuracy. As a result, a good print result can be obtained.

9. The slide mechanism 31 includes the second spring 29 that urges in the direction in which the pin 28P is separated from the lower end surface 272, the upper end surface 273 that extends in the direction intersecting the lifting and lowering directions ±B and faces the side opposite to the lower end surface 272, and the second abutting surface 282 that can switch the presence and absence of the contact with the upper end surface 273 by the sliding of the pin 28P. Therefore, the posture of the head 20H is easily stabilized in a state where the head 20H is not capped and in a state where the head 20H is not in contact with the eccentric cam 48. For example, the posture of the head 20H is easily stabilized when the head 20H is temporarily lifted to the retracted position for capping.

10. The length of the second spring 29 in a state where the second abutting surface 282 of the pin 28P is in contact with the upper end surface 273 of the elongated hole 27 is longer than the movement amount of the pin 28P (slide member) from the position where the second abutting surface 282 is in contact with the upper end surface 273 (third wall surface) of the elongated hole 27 to the position where the first abutting surface 281 is in contact with the lower end surface 272 (second wall surface) of the elongated hole 27. Therefore, when the pin 28P moves with the elastic deformation of the second spring 29 from the position where the second abutting surface 282 comes into contact with the upper end surface 273 of the elongated hole 27 toward the position where the first abutting surface 281 comes into contact with the lower end surface 272 of the elongated hole 27, the first abutting surface 281 of the pin 28P easily comes into contact with the lower end surface 272 of the elongated hole 27.

The above embodiment can also be changed to forms such as modified examples illustrated below. Further, a further modified example may be a combination of the above embodiment and the modified examples illustrated below, and a combination of the modified examples illustrated below may be a further modified example.

Figure 22:
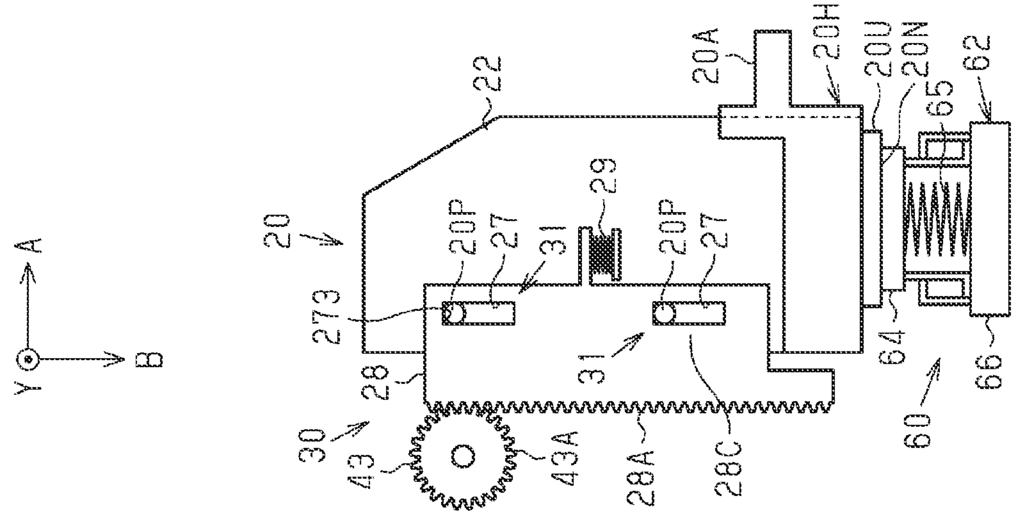
FIG. 22 is a schematic front sectional view illustrating a state when the head and the cap move relative to each other in a modified example.
Figure 21:
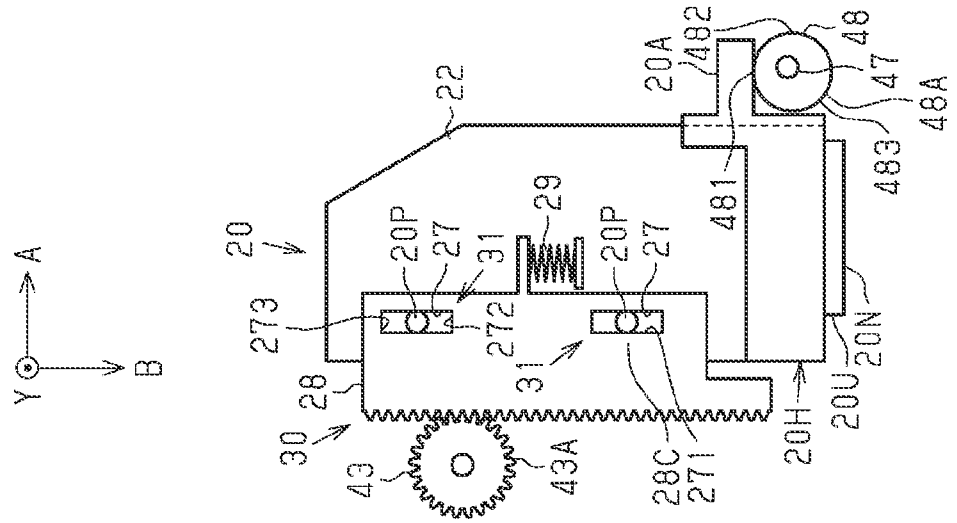
FIG. 21 is a schematic front sectional view illustrating a state when the head and the cap move relative to each other in a modified example.
Figure 20:
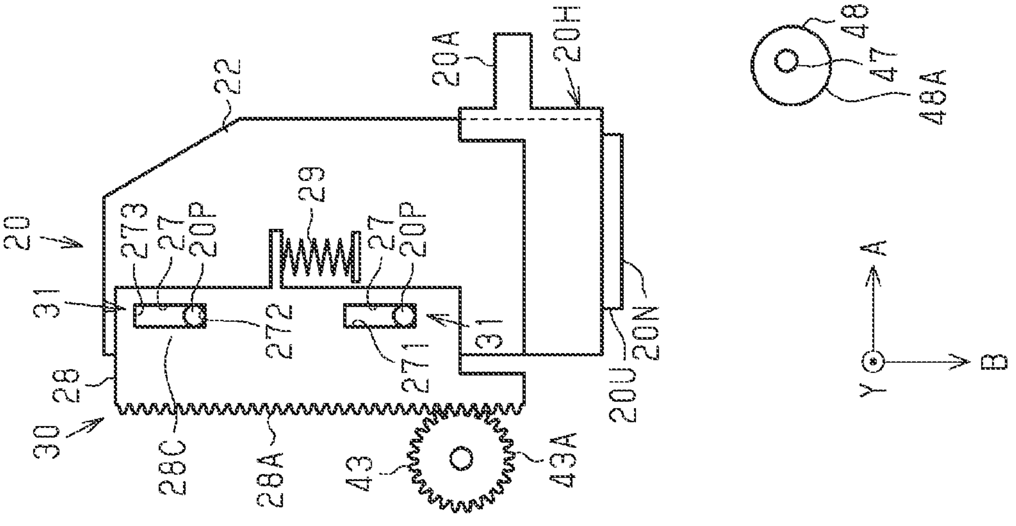
FIG. 20 is a schematic front sectional view illustrating a state when a head and a cap move relative to each other in a modified example.

Whether the pin or the elongated hole (opening) is provided in the head unit 20 or the rack 28 can be freely selected. The member having the second wall surface may be the first member or the second member. In the above embodiment, the rack 28 is provided with the pin and the support frame 22 that is the wall portion of the head unit 20 is provided with the elongated hole (opening), but the opposite configuration may be used. That is, as illustrated in FIGS. 20 to 22, an elongated hole (opening) may be provided in the rack 28, and the pin 20P may be provided in the support frame 22 that is the wall portion of the head unit 20. As illustrated in FIG. 20, the pin 20P protruding from the inner surface of the support frame 22 of the head unit 20 is inserted into the elongated hole 27 formed in the rack 28. The elongated hole 27 is a rectangular hole of which a longitudinal direction is a direction parallel to the lifting and lowering directions ±B. The inner peripheral surface of the elongated hole 27 includes the first wall surface 271 extending in the lifting and lowering directions ±B, the upper end surface 273 that is an example of the second wall surface extending in a direction intersecting the lifting and lowering directions ±B, and the lower end surface 272 that is an example of the third wall surface facing the upper end surface 273 and extending in a direction intersecting the lifting and lowering directions ±B. In this modified example, the pin 20P of the head unit 20 constitutes an example of the first member and the slide member. The pin 20P may be integrally formed with the support frame 22 that is the wall portion of the head unit 20, or may be fixed to the support frame 22 by using a fastening member such as a screw or an adhesive. The pin 20P may be fixed to the head 20H. Further, the wall member 28C, which is a portion of the rack 28 in which the elongated hole 27 is formed, corresponds to an example of the second member. The wall member 28C may be integrally formed with the rack 28, or may be fixed to the rack 28 by using a fastening member such as a screw or an adhesive.

Even in the configuration of this modified example, as illustrated in FIG. 20, the head unit 20 is at a position which is normally lowered relative to the rack 28 by the self-weight of the head unit 20 and the urging of the second spring 29. The pin 20P is in the abutting state against the third wall surface that is the lower end surface 272 of the elongated hole 27.

As illustrated in FIG. 21, at the time of the recording, the plate portion 20A abuts against the eccentric cam 48, so that the head 20H is positioned at the height at the time of the recording. The control section 26 forward drives the motor 41 and further lowers the height position of the rack 28. The position of the head unit 20 is regulated at the position where the plate portion 20A abuts against the eccentric cam 48, and does not further lower, and the rack 28 lowers relative to the head unit 20 while compressing the second spring 29. As a result, the pin 20P lifts from the position abutting against the third wall surface that is the lower end surface 272 thereof within the elongated hole 27. At this time, since the second spring 29 is compressed, the restoring force with which the second spring 29 tries to originally return operates in the lowering direction of the head unit 20. Therefore, in a case where the head 20H is positioned at the target recording position, if the position below the target recording position including a margin is set as the target position, positioning can be performed in a state where the plate portion 20A always abuts against the cam surface 48A of the eccentric cam 48 even if there is some variation. Therefore, the position accuracy at the time of the recording of the head 20H can be improved regardless of the individual difference of the printer 1.

Further, as illustrated in FIG. 22, at the time of the capping, the head 20H comes into contact with the cap 64. Further, when the head 20H is pushed in the B direction that is the lowering side, the pin 20P is separated from the third wall surface that is the lower end surface 272 of the elongated hole 27 and abuts against the second wall surface that is the upper end surface 273 thereof with the compressive deformation of the second spring 29. Therefore, no further slide of the rack 28 and the head unit 20 is possible via the slide mechanism 31. In this process, the cap 64 is slightly lowered by the force in the B direction received from the head 20H with the compressive deformation of the first spring 65. As illustrated in FIG. 22, after the pin 20P abuts against the second wall surface that is the upper end surface 273 of the elongated hole 27, the rack 28 and the head unit 20 are integrally lowered in the B direction. As a result, the cap 64 lowers with further compressive deformation of the first spring 65. When the rack 28 finishes the lowering to the target position at the time of the capping, the cap 64 presses against the nozzle surface 20N of the head 20H with an appropriate cap pressure. Since an appropriate cap pressure is obtained, drying of the ink within the nozzle N (see FIG. 9) is effectively suppressed under this capping state. At the time of the cleaning, since the closed space surrounded by the nozzle surface 20N and the cap 64 is depressurized to the required negative pressure, cleaning is appropriately performed to forcibly discharge the liquid from the nozzle N. The cleaning is not limited to the configuration of depressurizing the inside of the cap 64, and may be a configuration of pressurizing the liquid upstream of the nozzle N and forcibly discharging the liquid from the nozzle N.

Figure 24:
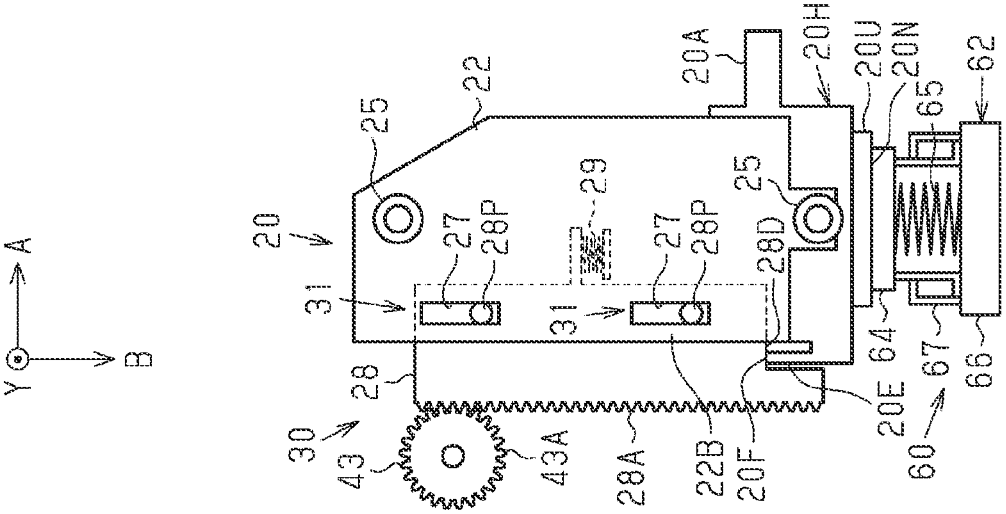
FIG. 24 is a schematic front sectional view illustrating a state when the head and the cap move relative to each other in a modified example.
Figure 23:
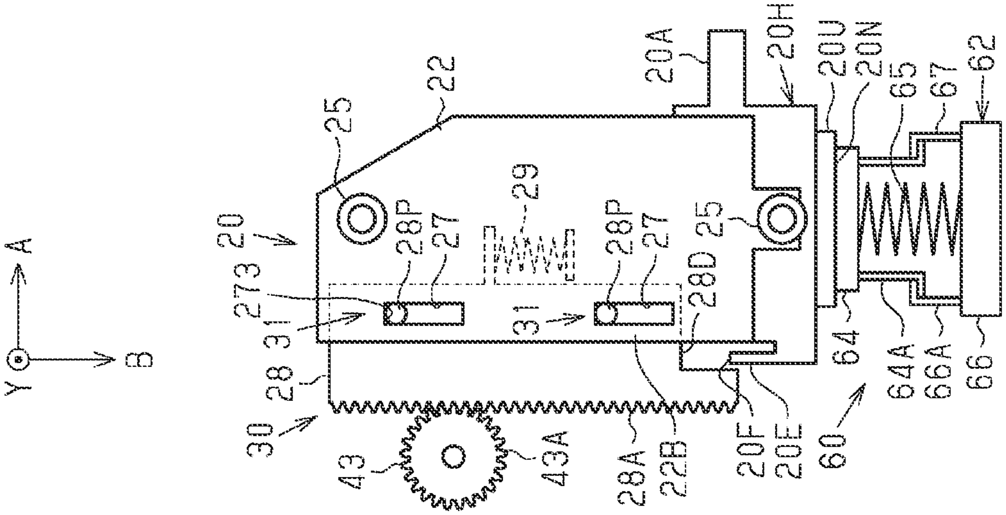
FIG. 23 is a schematic front sectional view illustrating a state when the head and the cap move relative to each other in a modified example.

The present disclosure is not limited to the configuration in which the abutting surface configured of the lower surface or the upper surface of the pin abuts against the second wall surface configured of the lower end surface or the upper end surface of the elongated hole 27, and a configuration may be provided in which the slide between the rack 28 and the head unit 20 is regulated by abutting against a member at a place other than the slide mechanism. That is, the abutting surface may not be provided on the slide member, and the second wall surface may be disposed at a different position capable of coming into contact with the abutting surface, not a part of the inner peripheral surface of the elongated hole. For example, as illustrated in FIGS. 23 and 24, the head unit 20 has an extension portion 20E extending upward from a side surface (left side surface in FIG. 23) at a lower portion thereof. An upper end surface 20F, which is an end surface of the extension portion 20E on the −B direction side, is the second wall surface. Further, an abutting surface 28D is formed at a lower end portion of the rack 28, which is an end portion on the B direction side, at a portion facing the extension portion 20E in the lifting and lowering directions ±B. As described above, the abutting surface 28D may be formed at a portion other than the pin 28P of the rack 28, and the second wall surface may be formed at a portion other than the inner peripheral surface of the elongated hole 27. As illustrated in FIG. 23, when the pinion 43 rotates from a state where the head unit 20 is at the lifted position, the head unit 20 lowers in the B direction, and the head 20H abuts against the cap 64. At this time, the pin 28P abuts against the third wall surface configured of the upper end surface 273 of the elongated hole 27.

As illustrated in FIG. 24, when the pinion 43 further forward rotates (clockwise direction in FIG. 24), the rack 28 and the head unit 20 are lowered, and the rack 28 slides in the B direction with respect to the head unit 20 with the compressive deformation of the second spring 29. At this time, the pin 28P lowers within the elongated hole 27. The abutting surface 28D of the rack 28 abuts against the upper end surface 20F of the extension portion 20E, so that further slide between the rack 28 and the head unit 20 is regulated. Further, when the pinion 43 rotates, the rack 28 and the head unit 20 are integrally lowered, and the head 20H further pushes the cap 64, so that the first spring 65 is compressively deformed. As a result, the cap 64 can be pressed against the nozzle surface 20N with an appropriate cap pressure. As described above, at a portion other than the slide mechanism 31, the abutting surface 28D and the upper end surface 20F are provided, and further slide between the rack 28 and the head unit 20 via abutting between the abutting surface 28D and the upper end surface 20F may be regulated. Even with this configuration, the lifting and lowering mechanism 30 can move the head 20H toward the cap 64 in a state where the head 20H does not slide via the slide mechanism 31 in the direction away from the cap 64.

The second wall surface is not limited to the lower end surface 272 (FIGS. 10 and 19) of the elongated hole 27, the upper end surface 273 (FIG. 22) of the elongated hole 27, and the abutting surface 28D (FIGS. 23 and 24) that is the lower surface of the rack 28, and may be a surface of the wall portion at a place different from the elongated hole 27 and the rack 28.

The third wall surface is not limited to the lower end surface 272 (FIG. 19) of the elongated hole 27 and the upper end surface 273 (FIG. 22) of the elongated hole 27, and may be a surface of the wall portion at a place different from the elongated hole 27.

The slide of the slide member may be regulated by other than the abutting between the pin and the elongated hole. That is, the abutting surface may be provided in addition to the slide member.

The first member is not limited to the configuration being integrally molded with the support frame 22, and may be assembled to the support frame 22 as a separate member. In short, the first member may be directly fixed to the head 20H, indirectly fixed to the head 20H, or integrally molded.

The pin 28P, which is an example of the second member, is not limited to the configuration being fixed to the rack 28, and may be fixed to a member assembled to the rack as a separate member. In short, the second member may be directly fixed to the lifting and lowering mechanism, indirectly fixed, or integrally molded.

The first member fixed to the head 20H may be the pin 28P, and the second member fixed to the rack 28 constituting the lifting and lowering mechanism 30 may be a member having the elongated hole 27. In this case, the pin 28P may be fixed to the support frame 22 or may be directly fixed to both side surfaces of the head 20H.

The slide mechanism 31 may be configured to have, for example, a rail that is an example of the first member extending in the lifting and lowering directions ±B and the second member that is fitted to the rail. In this case, the rail and the member that is fitted to the rail may be configured to have an uneven cross section, and a concave portion and a convex portion are fitted to each other.

After the head 20H comes into contact with the cap 64, the lifting and lowering mechanism 30 relatively moves the head 20H toward the cap 64 in a state where the head 20H does not slide via the slide mechanism 31 in the direction away from the cap 64. The head 20H may be temporarily stopped in the middle thereof if there is no slide in the direction away from the cap 64. For example, the spring constant of the second spring 29 is much smaller than the spring constant of the first spring 65, and the movement of the head 20H toward the cap 64 may be temporarily stopped in the slide process by the slide mechanism 31 or a part of the slide process.

Instead of the configuration in which the cap 64 approaches the head 20H and is urged in the B direction by the urging force of the first spring 65, a configuration may be provided in which the first spring 65 is eliminated and the cap 64 is fixed to the cap holder 66. Even with this configuration, after the head 20H comes into contact with the cap 64, the lifting and lowering mechanism 30 can relatively move the head 20H toward the cap 64 in a state where the head 20H does not slide via the slide mechanism 31 in the direction away from the cap 64.

The slide mechanism 31 is provided at two locations having different positions in the lifting and lowering directions ±B, but may be provided at one location or at a plurality of locations of three or more locations. The head unit 20 and the rack 28 may be slidably configured in the lifting and lowering directions ±B via the slide mechanism 31.

The lifting and lowering mechanism to which the second member is fixed is not limited to the rack 28. For example, the mechanism for lifting and lowering the head 20H may be exchanged to a rack and pinion mechanism to be a belt type power transmission mechanism. In the present example, the belt type power transmission mechanism includes an endless timing belt as a configuration component of the lifting and lowering mechanism. A fixing location of the lifting and lowering mechanism to which the second member is fixed may be the endless timing belt. The second member including the elongated hole may be fixed to the timing belt, and the pin may be fixed to the head unit 20 as an example of the first member.

The present disclosure is not limited to the configuration in which the first member formed of the wall member 22B having the elongated hole 27 and the head 20H are integrally molded, and the first member and the head 20H may be fixed via a fastening member such as a screw, or fixed by an adhesive or welding. Further, the present disclosure is not limited to the configuration in which the pin 28P that is an example of the second member, and the rack 28 that is an example of the lifting and lowering mechanism are integrally molded, and the pin 28P and the rack 28 may be fixed via a fastening member such as a screw, or fixed by an adhesive or welding.

The control section 26 may have a software configuration with which a computer executes a program such as a CPU, or a hardware configuration by an electronic circuit such as an ASIC. Further, the control section 26 may be configured by cooperation of software and hardware.

The medium P is not limited to paper, and may be a synthetic resin film, medium, cloth, non-woven fabric, laminated medium, or the like.

The liquid ejecting apparatus is not limited to the ink jet printer 1, and the liquid ejecting apparatus may be an ink jet printing apparatus. Further, the liquid ejecting apparatus may be a multifunction apparatus having a scanner mechanism and a copy function in addition to the recording function.

The liquid ejecting apparatus is not limited to the ink jet type printer 1, and may be an apparatus that ejects a liquid other than ink. For example, a liquid ejecting apparatus may be provided which ejects a liquid substance including functional materials such as an electrode material and a coloring material (pixel material) used in the manufacture of a liquid crystal display, an electroluminescence (EL) display, or a surface emitting display in a form of dispersion or dissolution. Further, it may be a liquid ejecting apparatus that ejects a bioorganic substance used for the manufacture of a biochip, or a liquid ejecting apparatus that ejects a liquid that is a sample used as a precision pipette. Further, it may be a liquid ejecting apparatus that ejects a transparent resin liquid such as a thermosetting resin onto a substrate to form a microhemispherical lens (optical lens) used for an optical communication element, a liquid ejecting apparatus that ejects etching liquid such as an acid or an alkali to etch the substrate, or the like, or a liquid ejecting apparatus that ejects a fluid substance such as a gel (for example, a physical gel). Further, the liquid ejecting apparatus may be a 3D printer for three-dimensional modeling that ejects a photocurable resin liquid by an ink jet method to form a three-dimensional object.

Hereinafter, the technical concept grasped from the above-described embodiment and modified examples will be described together with the effects.

A. The liquid ejecting apparatus includes a slide mechanism that has a first member and a second member configured to slide with each other in lifting and lowering directions; a head that is fixed to the first member and has a nozzle for ejecting a liquid; a lifting and lowering mechanism that is fixed to the second member, and lifts and lowers the head in the lifting and lowering directions; and a cap that covers the nozzle. The lifting and lowering mechanism relatively moves the head toward the cap in a state where the head does not slide via the slide mechanism in a direction away from the cap.

According to this configuration, the lifting and lowering mechanism moves the head toward the cap in a state where the head does not slide via the slide mechanism in the direction away from the cap. Therefore, after the head comes into contact with the cap, the required cap pressure is easily obtained even if the moving distance of the head is short. For example, in a case where the head is stopped at a position where the head can slide via the slide mechanism in the direction away from the cap and the capping is completed, variation in the cap pressure is likely to occur. On the other hand, according to the above configuration, a desired cap pressure can be obtained when the cap comes into contact with the head in a state where the nozzle is covered.

B. In the liquid ejecting apparatus, the slide mechanism may include a first wall surface extending in the lifting and lowering directions, a second wall surface extending in a direction intersecting the lifting and lowering directions, a slide member that slides with respect to the first wall surface while being in contact with the first wall surface, and an abutting surface configured to switch presence and absence of contact with the second wall surface by sliding of the slide member, and the abutting surface may come into contact with the second wall surface so that the head does not slide in a direction away from the cap.

According to this configuration, the presence and absence of the slide can be switched depending on the presence and absence of contact between the abutting surface and the second wall surface, so that the mechanism can be simplified.

C. The liquid ejecting apparatus includes a slide mechanism that has a first member and a second member configured to slide with each other in lifting and lowering directions; a head that is fixed to the first member and has a nozzle for ejecting a liquid; a lifting and lowering mechanism that is fixed to the second member, and lifts and lowers the head in the lifting and lowering directions; and a cap that covers the nozzle, in which the slide mechanism includes a first wall surface extending in the lifting and lowering directions, a second wall surface extending in a direction intersecting the lifting and lowering directions, a slide member that slides with respect to the first wall surface while being in contact with the first wall surface, and an abutting surface configured to switch presence and absence of contact with the second wall surface by sliding of the slide member, and the lifting and lowering mechanism relatively moves the head toward the cap in a state where the abutting surface is in contact with the second wall surface.

According to this configuration, the lifting and lowering mechanism moves the head toward the cap in a state where the head does not slide via the slide mechanism in the direction away from the cap. Therefore, after the head comes into contact with the cap, the required cap pressure is easily obtained even if the moving distance of the head is short. For example, in a case where the head is stopped at a position where the head can slide via the slide mechanism in the direction away from the cap and the capping is completed, variation in the cap pressure is likely to occur. On the other hand, according to the above configuration, a desired cap pressure is easily obtained when the cap comes into contact with the head while in a state where the nozzle is covered.

D. The liquid ejecting apparatus may further include a cap holder for holding the cap; and a first spring fixed between the cap and the cap holder, in which the lifting and lowering mechanism may move the head toward the cap to compress the first spring in a state where the abutting surface is in contact with the second wall surface.

According to this configuration, since the cap can be moved by the elasticity of the first spring following the nozzle surface, the cap can easily cover the nozzle regardless of a flatness of the cap holder. Further, since the first spring is further compressed after the abutting surface comes into contact with the second wall surface, the required cap pressure is easily obtained even if the moving distance of the head is short.

E. In the liquid ejecting apparatus, the slide mechanism may further include a second spring that urges the abutting surface and the second wall surface in a direction in which the abutting surface and the second wall surface are separated from each other; a third wall surface that is a surface extending in a direction intersecting the lifting and lowering directions, and facing a side opposite to the second wall surface; and a second abutting surface configured to switch presence and absence of contact with the third wall surface by sliding of the slide member, and a spring constant of the second spring may be smaller than a spring constant of the first spring.

According to this configuration, when the head is in the lifted position not covered by the cap, the second abutting surface of slide member abuts against the third wall surface by the portion fixed to the head, the self-weight of the head, and the urging force of the second spring. Therefore, the posture of the head is easily stabilized. Further, when the head is lifted from the cap position or the recording position, the vibration of the head can be absorbed by the elastic deformation of the second spring. Therefore, it is possible to suppress the destruction of the meniscus formed by the surface tension of the liquid within the nozzle near the opening of the nozzle due to the vibration of the head. Destruction of the meniscus affects the ejection performance such as the ejecting direction and the ejecting amount when the liquid is ejected from the nozzle. However, since this influence is reduced, the liquid can be normally ejected from the nozzle of the head. Since the spring constant of the second spring is smaller than the spring constant of the first spring, the drive amount of the rack required for the slide member to abut against the second wall surface after the head comes into contact with the cap is relatively small. Therefore, after the head comes into contact with the cap, the capping operation of covering the head with the cap can be completed immediately. Further, the drive amount of the rack required from the position where the slide member abuts against the second wall surface to the position where the slide member abuts against the third wall surface is relatively small from the capping state until the head is separated from the cap. Therefore, the capping operation of covering the head with the cap can be completed immediately.

F. In the liquid ejecting apparatus, the head may include a nozzle surface that is a surface through which the nozzle is open, a regulation surface that is a surface facing a direction opposite to the direction in which the nozzle surface of the head faces and switches presence and absence of contact with the head by movement of the head in the lifting and lowering directions may be provided, and the first wall surface and the slide member of the slide mechanism may slide with each other in a state where the head is in contact with the regulation surface.

According to this configuration, positioning of the head can be performed by the head being in contact with the regulation surface. Further, since the slide member of the slide mechanism slides in a state where the head is in contact with the regulation surface, the control of the lifting and lowering mechanism can be simplified.

G. The liquid ejecting apparatus may further include an eccentric cam having a cam surface and a shaft for rotating the eccentric cam, in which the regulation surface may be configured of the cam surface of the eccentric cam, and may include a first regulation surface in which a position of the head in the lifting and lowering directions is a first position and a second regulation surface in which a position of the head is a second position.

According to this configuration, by the rotation of the eccentric cam, the position of the head being in contact with the regulation surface of the eccentric cam in the lifting and lowering directions can be changed.

H. In the liquid ejecting apparatus, the head may eject the liquid in a state where the head is in contact with the regulation surface.

According to this configuration, the position of the head at the time of the printing can be made highly accurate. The print result is good.

I. In the liquid ejecting apparatus, the slide mechanism may include a second spring that urges the slide member and the second wall surface in a direction in which the slide member and the second wall surface are separated from each other, a third wall surface that is a surface extending in a direction intersecting the lifting and lowering directions and facing a side opposite to the second wall surface, and a second abutting surface configured to switch presence and absence of contact with the third wall surface by sliding of the slide member.

According to this configuration, since the second spring and the second wall surface are provided, the posture of the head is easily stabilized in a case where the head is not capped.

J. In the liquid ejecting apparatus, a length of the second spring in a state where the second abutting surface of the slide member is in contact with the third wall surface may be longer than a movement amount that the slide member moves from a position where the second abutting surface comes into contact with the third wall surface to a position where the abutting surface comes into contact with the second wall surface.

According to this configuration, when the slide member moves with elastic deformation of the second spring from the position where the second abutting surface comes into contact with the third wall surface to the position where the abutting surface comes into contact with the second wall surface, the abutting surface of the slide member easily comes into contact with the second wall surface.

What is claimed is:

1. A liquid ejecting apparatus comprising:

a slide mechanism that has a first member, which includes an elongated hole in a lifting and lowering directions along a straight line;

a head that is inserted into the first member and has a nozzle for ejecting a liquid;

a lifting and lowering mechanism that has a protrusion perpendicular to a plane of the lifting and lowering mechanism and lifts and lowers the head along the lifting and lowering directions, wherein the protrusion slides within the elongated hole along the lifting and lowering directions; and a cap that covers the nozzle;

a cap holder for holding the cap; and a first spring fixed between the cap and the cap holder, wherein the elongated hole is formed with a first wall surface extending in the lifting and lowering direction, and a second wall surface extending in a direction intersecting the lifting and lowering direction, the protrusion slides with respect to the first wall surface while being in contact with the first wall surface and includes a first abutting surface configured to change presence and absence of contact with the second wall surface by sliding of the protrusion, the lifting and lowering mechanism relatively moves the head toward the cap in a state where the first abutting surface is in contact with the second wall surface, the lifting and lowering mechanism moves the head toward the cap to compress the first spring in a state where the first abutting surface is in contact with the second wall surface, a spring constant of the second spring is smaller than a spring constant of the first spring, the slide mechanism further comprises:

a second spring that urges the abutting surface and the second wall surface in a direction in which the abutting surface and the second wall surface are separated from each other, the elongated hole is further formed with:

a third wall surface that is a surface extending in a direction intersecting the lifting and lowering direction, and facing a side opposite to the second wall surface, and the protrusion further includes:

a second abutting surface configured to change presence and absence of contact with the third wall surface by sliding of the protrusion.

2. The liquid ejecting apparatus according to claim 1, wherein the head includes a nozzle surface that is a surface through which the nozzle is open, a regulation surface that is a surface facing a direction opposite to the direction in which the nozzle surface of the head faces and changes presence and absence of contact between the head and the regulation surface by movement of the head along the lifting and lowering direction is provided, and the first wall surface and the protrusion of the slide mechanism slide with each other in a state where the head is in contact with the regulation surface.

3. The liquid ejecting apparatus according to claim 2, further comprising:

an eccentric cam having a cam surface and a shaft for rotating the eccentric cam, wherein the regulation surface is configured of the cam surface of the eccentric cam, and includes a first regulation surface in which a position of the head in contact with the first surface in the first line is a first position and a second regulation surface in contact with the first surface in which a position of the head is a second position.

4. The liquid ejecting apparatus according to claim 2, wherein the head ejects the liquid in a state where the head is in contact with the regulation surface.

5. The liquid ejecting apparatus according to claim 1, wherein a length of the second spring in a state where the second abutting surface of the protrusion is in contact with the third wall surface is longer than a movement amount that the protrusion moves from a position where the second abutting surface comes into contact with the third wall surface to a position where the first abutting surface comes into contact with the second wall surface.

* * * * *